US010282339B2

(12) United States Patent
Woosley et al.

(10) Patent No.: US 10,282,339 B2
(45) Date of Patent: May 7, 2019

(54) SYSTEM FOR PRESENTING ELECTRICALLY SUPPORTED DEVICES

(71) Applicant: Apple Inc., Cupertino, CA (US)

(72) Inventors: Clayton R. Woosley, San Jose, CA (US); Aditya Rao, San Francisco, CA (US); Bo Feng, Changzhou (CN); David S. Kumka, San Francisco, CA (US); Joseph I. Briskey, Aptos, CA (US); Min Chul Kim, San Jose, CA (US); Paul Z. Yuan, San Jose, CA (US); Yufan Liao, Cupertino, CA (US); George Tziviskos, San Jose, CA (US); Charles A. Schwalbach, Menlo Park, CA (US); Eric H. Wong, San Francisco, CA (US); David B. Kosecoff, San Francisco, CA (US); Steven C. Michalske, Sunnyvale, CA (US); Ariadne G. Smith, Cupertino, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 15/704,597

(22) Filed: Sep. 14, 2017

(65) Prior Publication Data
US 2018/0074988 A1   Mar. 15, 2018

Related U.S. Application Data

(60) Provisional application No. 62/394,604, filed on Sep. 14, 216, provisional application No. 62/418,262, filed on Nov. 6, 2016.

(51) Int. Cl.
*H01R 13/648* (2006.01)
*G06F 13/40* (2006.01)
(Continued)

(52) U.S. Cl.
CPC ........ *G06F 13/4068* (2013.01); *G06F 13/385* (2013.01); *G06F 13/4282* (2013.01);
(Continued)

(58) Field of Classification Search
CPC .............. H01R 13/6633; H01R 13/631; H01R 13/025; H01B 9/02; G11B 33/126;
(Continued)

(56) References Cited

U.S. PATENT DOCUMENTS 5,874,707 A * 2/1999 Iida .................... H05H 1/34
219/121.36
6,019,615 A * 2/2000 Masuda .............. H01R 9/0518
174/653
(Continued)

*Primary Examiner* — Abdullah A Riyami
*Assistant Examiner* — Nelson R. Burgos-Guntin
(74) *Attorney, Agent, or Firm* — Van Court & Aldridge LLP

(57) ABSTRACT

Systems for presenting electrically supported devices and methods for assembling the same are provided. A platform assembly may be equipped with one or more features for enabling a support module assembly to be easily removed from a bottom table surface of a table and replaced with another support module subassembly (e.g., to physically upgrade the support module assembly) while maintaining the position of a user device and/or cable assembly with respect to the table).

20 Claims, 37 Drawing Sheets

(51) Int. Cl.
*H01R 13/66* (2006.01)
*G06F 13/38* (2006.01)
*G06F 13/42* (2006.01)
*H01R 13/631* (2006.01)
*H01R 13/02* (2006.01)
*G11B 33/12* (2006.01)
*H01B 9/02* (2006.01)

(52) U.S. Cl.
CPC .......... *G11B 33/122* (2013.01); *G11B 33/126* (2013.01); *H01B 9/02* (2013.01); *H01R 13/025* (2013.01); *H01R 13/631* (2013.01); *H01R 13/6633* (2013.01)

(58) Field of Classification Search
CPC . G11B 33/122; G06F 13/4282; G06F 13/385; G06F 13/4068
USPC ... 439/680, 660, 323, 694, 466, 607.01, 925
See application file for complete search history.

(56) References Cited

U.S. PATENT DOCUMENTS

| | | | | |
|---|---|---|---|---|
| 6,280,208 | B1* | 8/2001 | Masuda | H01R 4/64 174/359 |
| 6,669,511 | B1* | 12/2003 | Yagi | H01R 4/646 439/607.44 |
| 6,674,005 | B2* | 1/2004 | Yagi | H01R 9/032 138/123 |
| 7,195,504 | B2* | 3/2007 | Bertini | H01R 13/523 439/201 |
| 8,241,062 | B2* | 8/2012 | Tsuruta | H01R 9/032 439/352 |
| 8,257,101 | B2* | 9/2012 | Ichio | H01R 13/4367 439/206 |
| 9,748,704 | B2* | 8/2017 | Wang | H01R 13/5205 |
| 9,758,113 | B2* | 9/2017 | Adachi | B60R 16/0215 |
| 9,862,337 | B2* | 1/2018 | Inao | B60R 16/0215 |
| 2015/0340801 | A1* | 11/2015 | Tashiro | H01R 13/506 439/587 |
| 2018/0076561 | A1* | 3/2018 | Aoshima | H01R 13/40 |

* cited by examiner

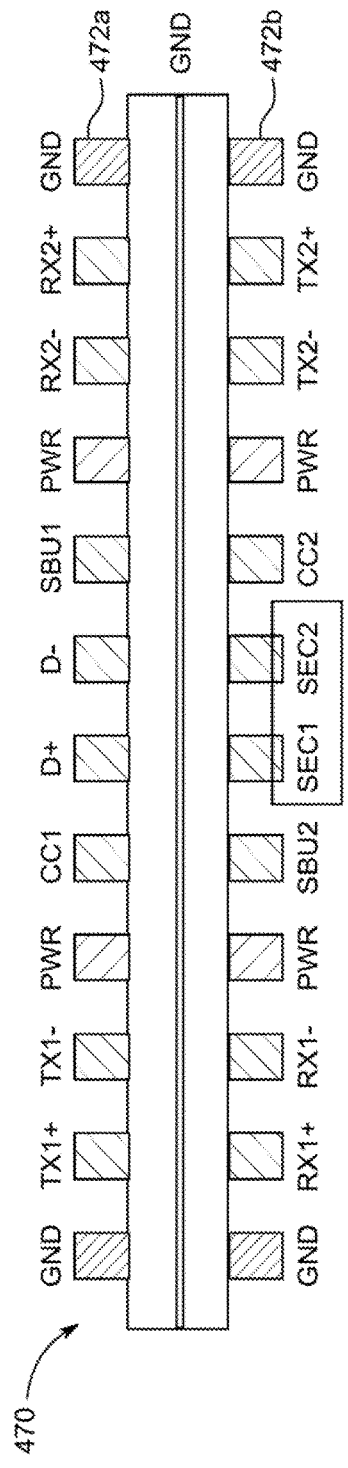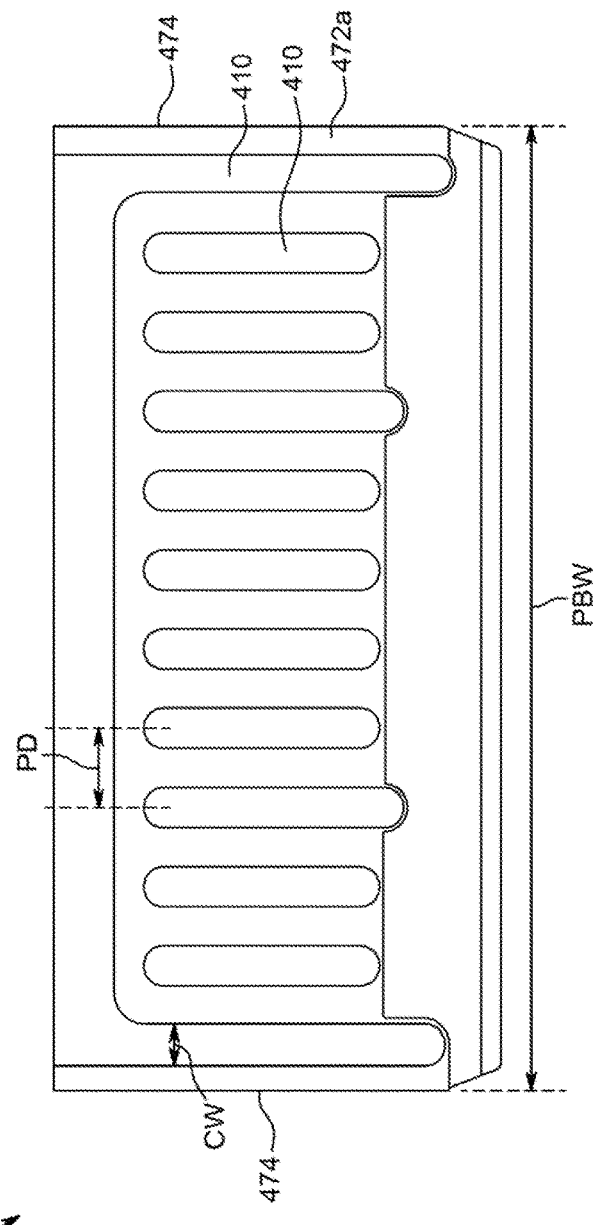

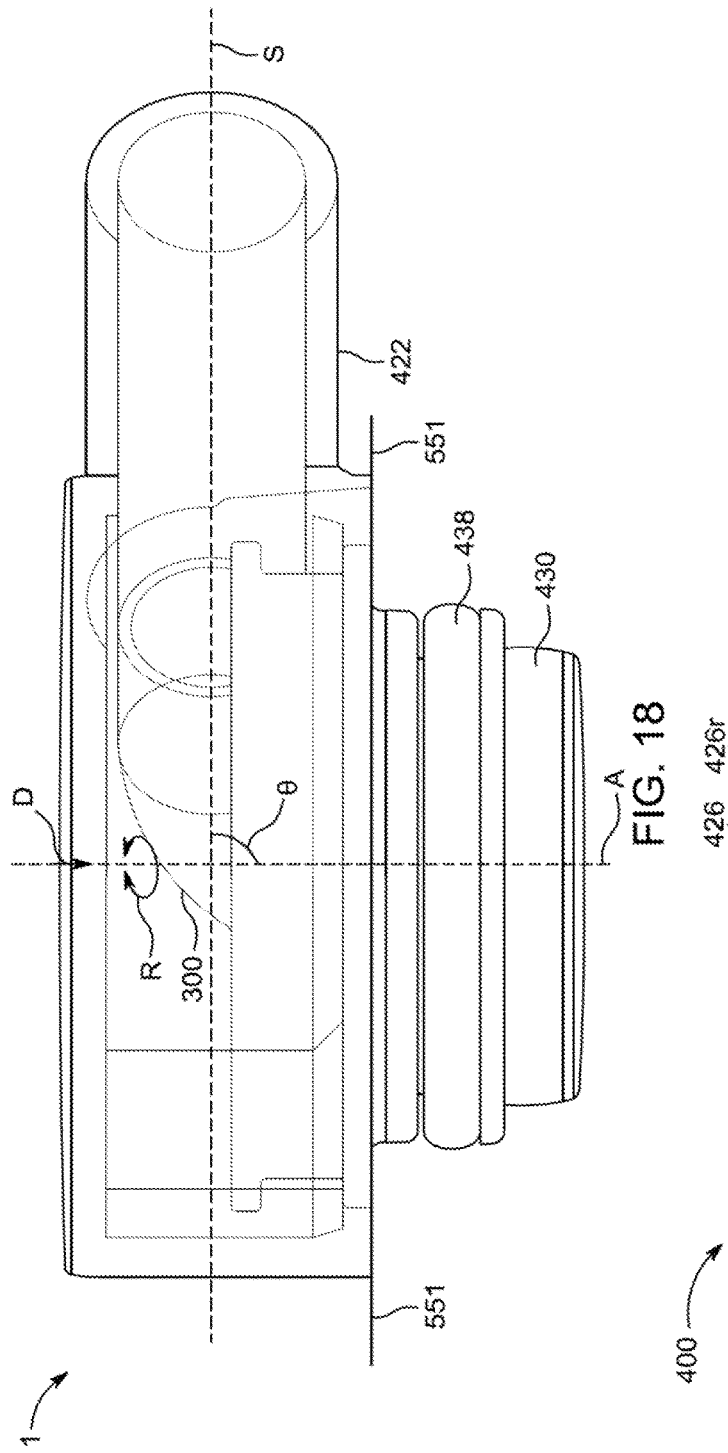
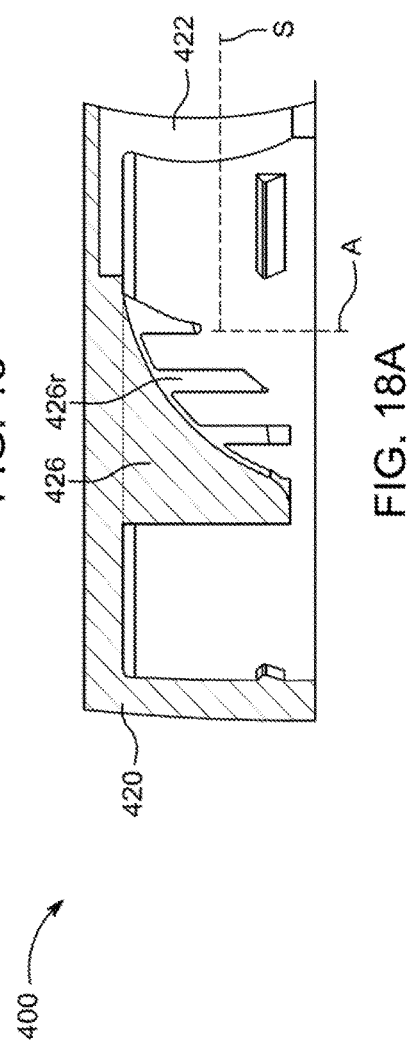

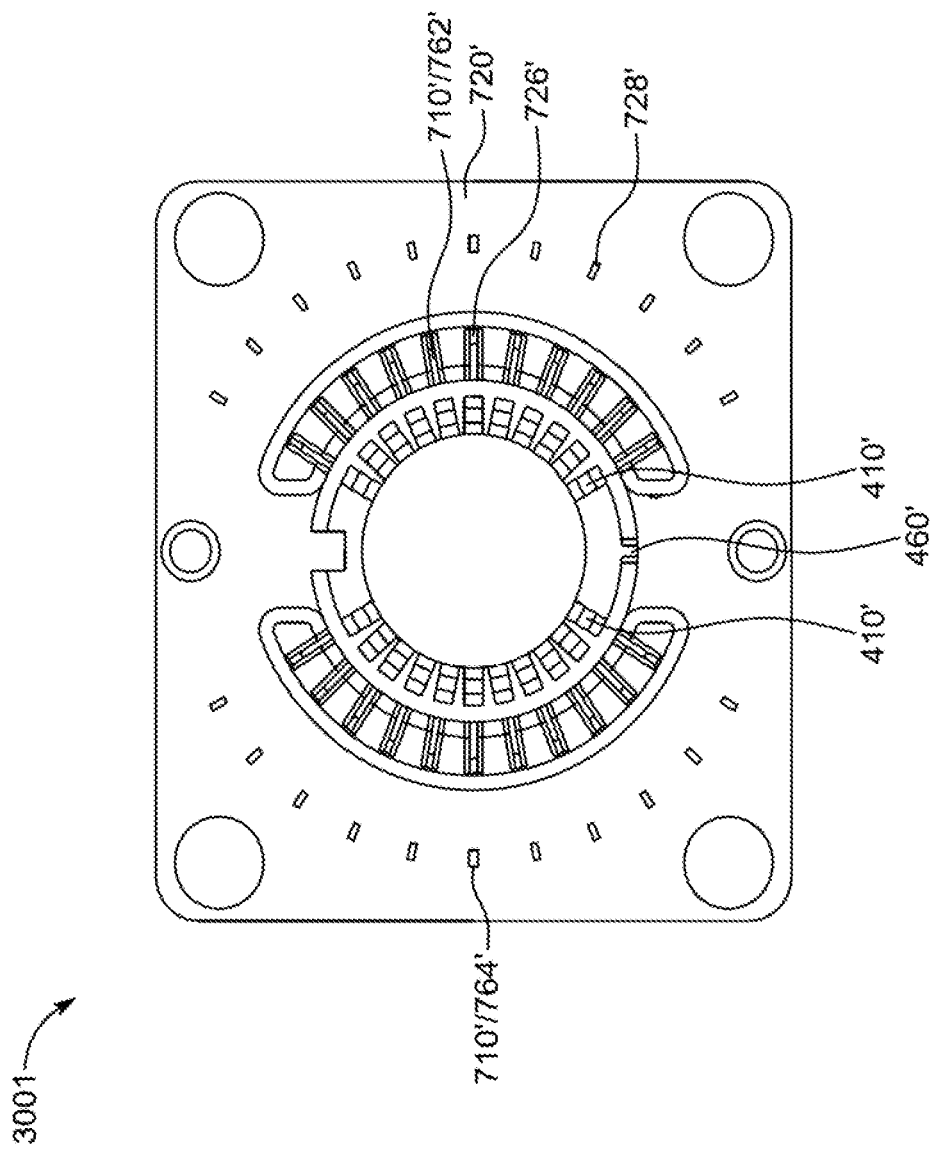

SYSTEM FOR PRESENTING ELECTRICALLY SUPPORTED DEVICES

CROSS-REFERENCE TO RELATED APPLICATION(S)

This application claims the benefit of prior filed U.S. Provisional Patent Application No. 62/394,604, filed Sep. 14, 2016, and of prior filed U.S. Provisional Patent Application No. 62/418,262, filed Nov. 6, 2016, each of which is hereby incorporated by reference herein in its entirety.

TECHNICAL FIELD

This can relate to presenting devices to users, including presenting user devices that are electrically supported by replaceable support module assemblies.

BACKGROUND OF THE DISCLOSURE

User devices are often presented to users in a retail setting with various power, data, and security cables for electrically supporting the user devices. However, such cables are often cumbersome or unsightly.

SUMMARY OF THE DISCLOSURE

Systems for presenting electrically supported devices and methods for assembling the same are provided.

For example, a cable assembly is provided for electrically coupling with a cable module connector subassembly of a support module assembly including a support mating feature, wherein the cable module connector subassembly includes a cable module connector contact, the cable assembly including a cable subassembly including an electrical conductor extending between a first conductor end and a second conductor end, and a module cable connector subassembly including a boot structure including an interior boot surface and an exterior boot surface extending from a first boot open end to a second boot open end, wherein the interior boot surface defines a boot space, and a module cable connector contact that is electrically coupled to the second conductor end at an electrical coupling location within the boot space, wherein the exterior boot surface includes a boot mating feature operative to mate with the support mating feature, and wherein the module cable connector subassembly is operative to interface with the support module assembly for electrically coupling the module cable connector contact to the cable module connector contact when the boot mating feature is mated with the support mating feature.

As another example, a support module assembly is provided for electrically coupling with a module cable connector subassembly, wherein the module cable connector subassembly includes a module cable connector contact, the support module assembly including a support structure including a support structure opening extending between a top surface of the support structure and a bottom surface of the support structure, a trim component including an interior trim surface and an exterior trim surface extending from a first trim open end to a second trim open end, and a cable module connector subassembly including a cable module connector housing, and a cable module connector contact positioned at least partially within the cable module connector housing, wherein the interior trim surface defines a trim space operative to receive a portion of the module cable connector subassembly, wherein a first portion of the trim space is positioned within the structure opening, wherein at least a portion of the cable module connector housing is positioned within a second portion of the trim space, and wherein the cable module connector contact is operative to be electrically coupled to the module cable connector contact when the trim space receives the portion of the module cable connector subassembly.

As yet another example, a module cable connector subassembly is provided for electrically coupling with a cable module connector subassembly, wherein the cable module connector subassembly includes a cable module connector contact, the module cable connector subassembly including a boot structure including an interior boot surface and an exterior boot surface extending from a first boot open end to a second boot open end, wherein the interior boot surface defines a boot space, a module cable connector contact including a first module cable connector contact portion that is positioned within the boot space, and a second module cable connector contact portion that is positioned outside of the boot space, and a gasket that is positioned at least partially about the module cable connector contact and across the second boot open end, wherein the gasket and the boot structure together provide at least a portion of an electromagnetic interference cage for protecting the first module cable connector contact portion from electromagnetic interference, and wherein the gasket is operative to interact with a portion of the cable module connector subassembly to provide at least a portion of an electromagnetic interference shield for shielding an electrical signal communication coupling between the module cable connector subassembly and the cable module connector subassembly when the second module cable connector contact portion is electrically coupled to the cable module connector contact.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIG. 17 is a schematic view of an illustrative signal pin arrangement for the module cable connector subassembly of FIGS. 14-16;

FIG. 17A is a side view, similar to FIG. 15, of a plug board of the module cable connector subassembly of FIGS. 14-17;

FIG. 18 is a side view of another portion of the module cable connector subassembly of FIGS. 14-17A with certain components partially transparent;

FIG. 18A is a cross-sectional view of another portion of the module cable connector subassembly of FIGS. 14-18;

FIG. 32 is a top view of the portion of the system of FIGS. 30 and 31 with a printed circuit board of the cable module connector not shown, taken from line XXXII-XXXII of FIG. 31.

DETAILED DESCRIPTION OF THE DISCLOSURE

Systems and methods for presenting electrically supported devices are provided and described with reference to FIGS. 1-32.

Figure 1:
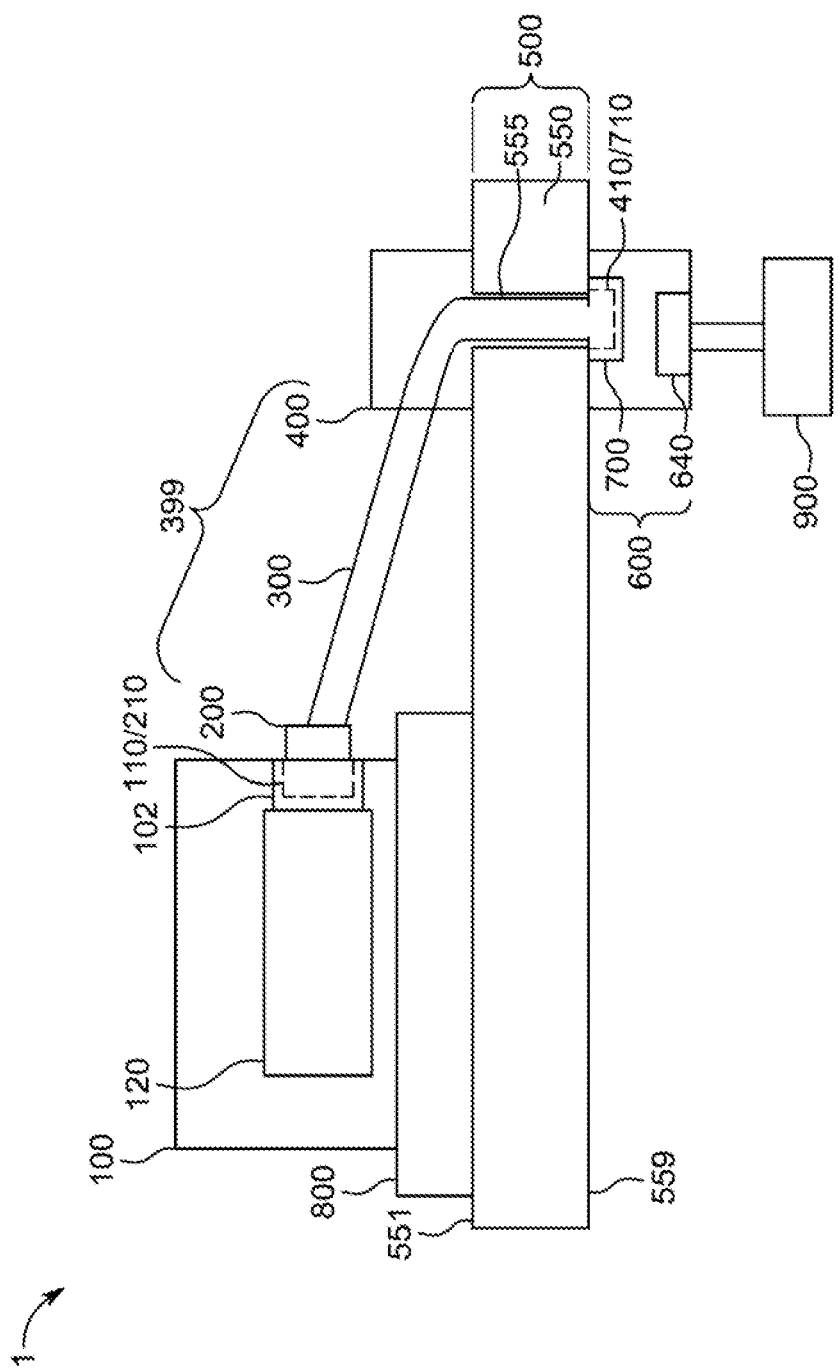
FIG. 1 is a schematic view of an illustrative system for presenting an electrically supported user device.

As shown in FIG. 1, a system 1 may include a cable assembly 399 that may be operative to electrically couple a user device 100 to a support module assembly 600. Cable assembly 399 may include a cable subassembly 300 extending between a first cable connector subassembly 200 (or device cable connector subassembly 200) and a second cable connector subassembly 400 (or module cable connector subassembly 400). Cable subassembly 300 may include at least one electrical conductor, such as one or more cable conductors 320 extending between a device conductor end 321 and a module conductor end 329 (see, e.g., FIG. 2), that may electrically couple at least one contact of device cable connector subassembly 200 with at least one respective contact of module cable connector subassembly 400, while device cable connector subassembly 200 may be operative to interface with user device 100 such that the least one contact of device cable connector subassembly 200 may be electrically coupled with at least one contact of a cable device connector 102 of user device 100, and while module cable connector subassembly 400 may be operative to interface with support module assembly 600 such that the at least one contact of module cable connector subassembly 400 may be electrically coupled with at least one contact of a cable module connector subassembly 700 of support module assembly 600, such that cable assembly 399 may electrically couple the at least one contact of user device 100 with the at least one contact of support module assembly 600.

Figure 2:
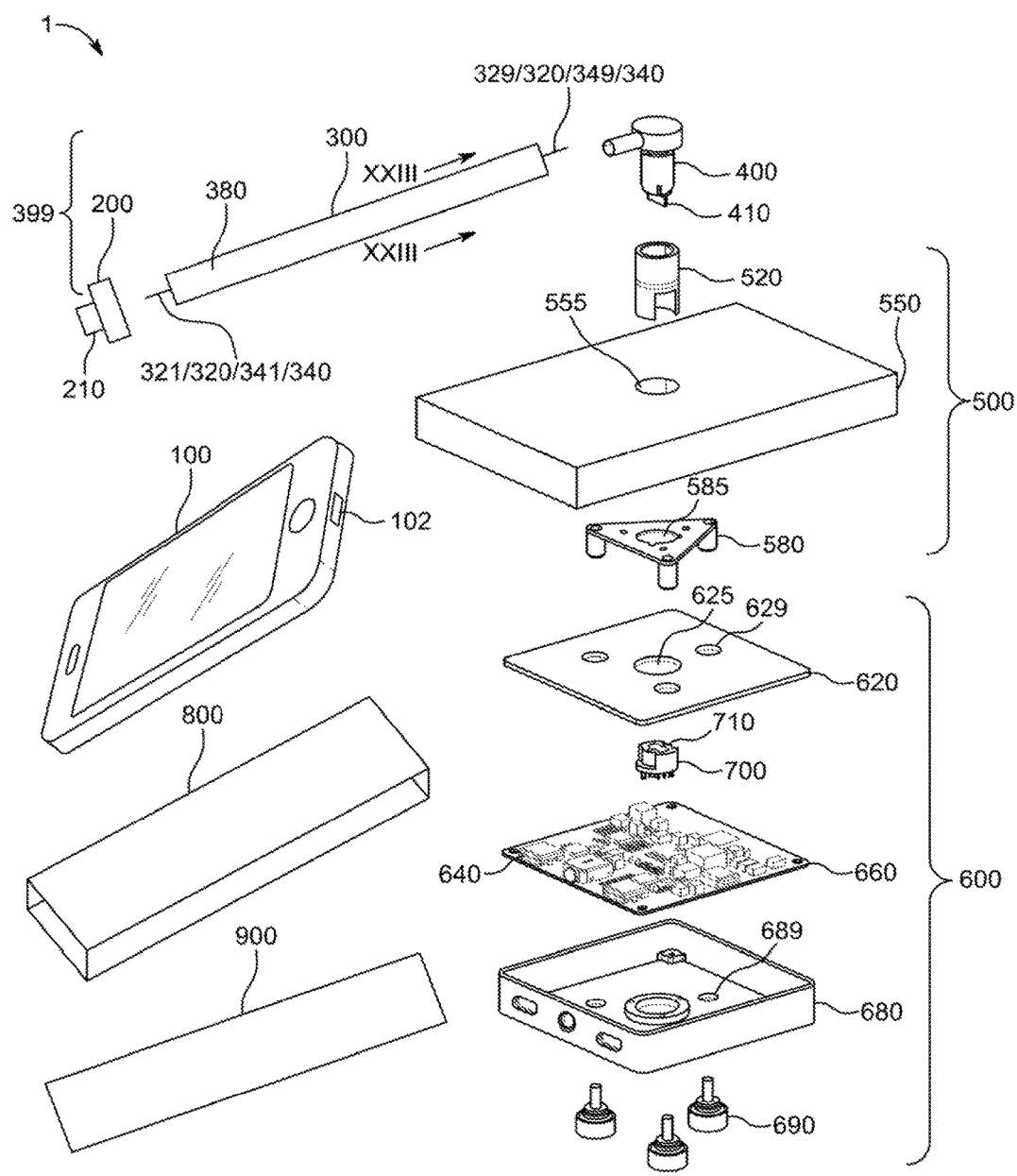
FIG. 2 is an exploded top perspective view of the system of FIG. 1.
Figure 3:
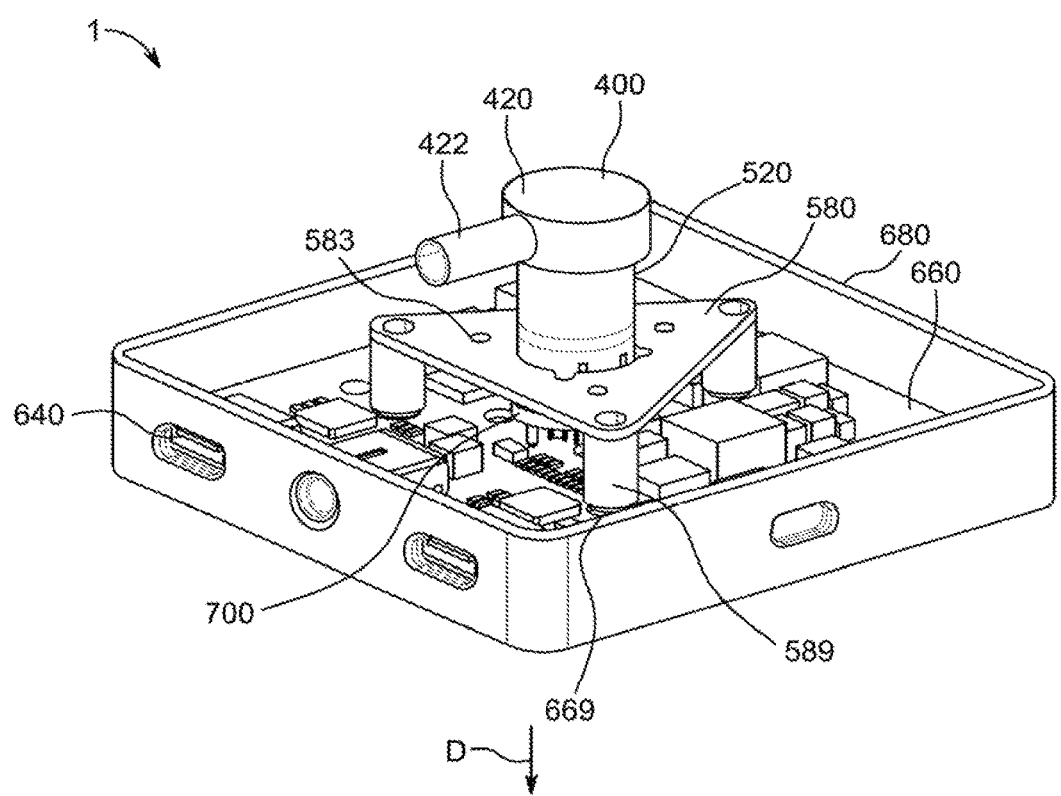
FIG. 3 is a top perspective view of a portion of the system of FIGS. 1 and 2 when partially assembled.
Figure 4:
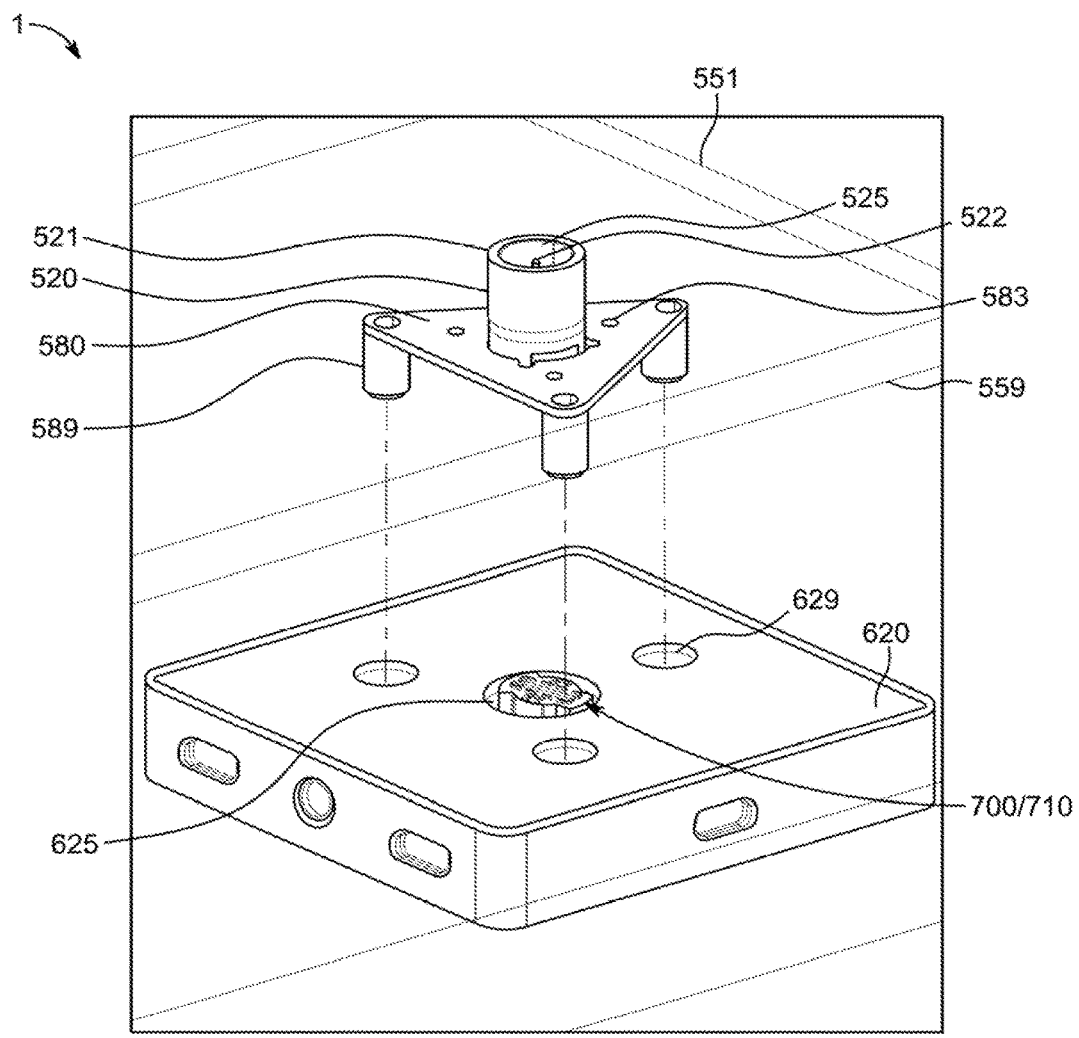
FIG. 4 is a top perspective view of a portion of the system of FIGS. 1-3 when partially assembled and with a table of the system partially transparent.
Figure 5:
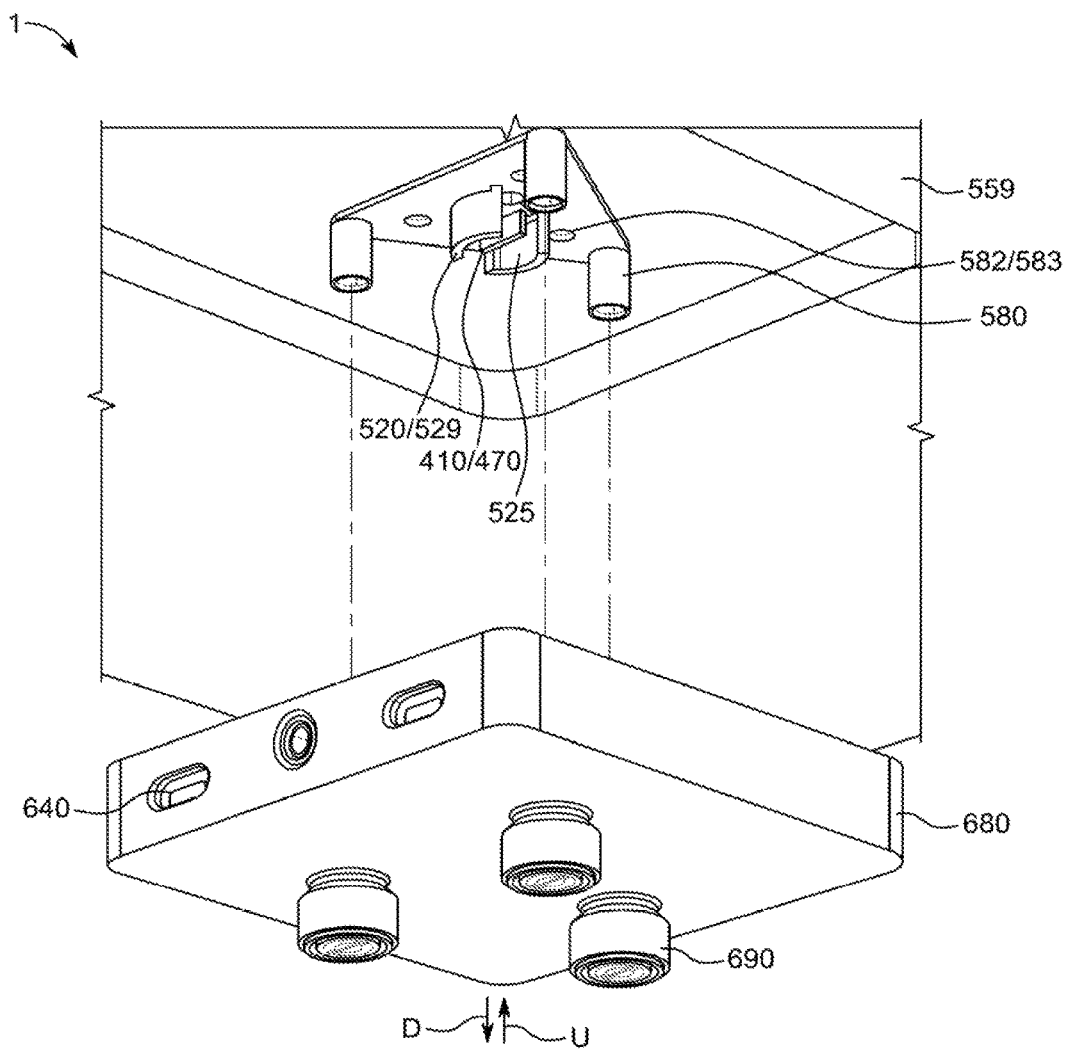
FIG. 5 is a bottom perspective view of a portion of the system of FIGS. 1-4 when partially assembled.

As shown in FIGS. 1 and 2, device cable connector subassembly 200 may include at one device cable connector contact, such as device cable connector contact 210 that may be electrically coupled to a device conductor end 321 of a respective cable conductor 320, while cable device connector 102 of user device 100 may include at least one respective cable device connector contact 110. As shown, device cable connector contact 210 may be a male-type contact that may be operative to be received and at least partially held by a respective female-type cable device connector contact 110, although it is to be understood that, in other embodiments, device cable connector contact 210 of device cable connector subassembly 200 may be a female-type and a respective cable device connector contact 110 of user device 100 may be a male-type. Alternatively, any one or more of the contacts of device cable connector subassembly 200 and/or of user device 100 may be genderless or of a mixed gender type. Moreover, as shown in FIGS. 1 and 2, module cable connector subassembly 400 may include at one module cable connector contact, such as module cable connector contact 410 that may be electrically coupled to a module conductor end 329 of a respective cable conductor 320, while cable module connector subassembly 700 of support module assembly 600 may include at least one respective cable module connector contact 710. As shown, module cable connector contact 410 may be a male-type contact that may be operative to be received and at least partially held by a respective female-type cable module connector contact 710, although it is to be understood that, in other embodiments, module cable connector contact 410 of module cable connector subassembly 400 may be a female-type and a respective cable module connector contact 710 of support module assembly 600 may be a male-type. Alternatively, any one or more of the contacts of module cable connector subassembly 400 and/or of support module assembly 600 may be genderless or of a mixed gender type.

User device 100 and support module assembly 600 may be any suitable subsystems that may be electrically coupled to one another via cable assembly 399. For example, in some particular embodiments, user device 100 may be any suitable user electronic device, such as a computer or media player or loud speaker or appliance, including any suitable user device circuitry 120 (e.g., processor, memory, communication component, user input/output interface, sensor, etc.), while support module assembly 600 may be any suitable source of power and/or data or may be any suitable assembly operative to manage or otherwise control communication of data and/or power to device 100 from an auxiliary source assembly 900 (e.g., any suitable source of power and/or data) that may be electrically coupled to support module assembly 600 at an auxiliary module connector 640 of support module assembly 600. For example, auxiliary source assembly 900 may be any suitable server for providing data updates (e.g., software and/or firmware updates) to user device 100 via assembly 600 and/or any suitable power source for providing power to user device 100 via assembly 600 and/or any suitable security device for monitoring the security of device 100 (e.g., the status of one or more security lines coupling assembly 600 to device 100). In some embodiments, system 1 may include multiple sets of a user device and a support module assembly, and each device/support module pair may be coupled to the same auxiliary source assembly 900 (e.g., via daisy chaining) such that a single auxiliary source device or assembly 900 may be operative to provide data and/or power and/or security to multiple user devices via multiple respective support module assemblies. Such power and/or data may be communicated between support module assembly 600 and user device 100 via cable assembly 399. Cable assembly 399 may be operative to include one or more electrical security signal lines that may be operative to activate an alarm of system 1 (e.g., an alarm of support module assembly 600 and/or of user device 100) when transmission of a security signal on a security signal line has been interrupted (e.g., due to an interface between device cable connector subassembly 200 and user device 100 being interrupted and/or due to an interface between module cable connector subassembly 400 and support module assembly 600 being interrupted and/or due to a conductor of cable subassembly 300 being damaged (e.g., cut) along the length of cable subassembly 300), which may provide security to device 100 within system 1.

User device 100 may be presented to a user on a first side of a platform assembly 500 while support module assembly 600 may be at least partially hidden from a user on a second side of platform assembly 500. For example, as shown, platform assembly 500 may include any suitable support structure, such as a table 550 with a top table surface 551, a bottom table surface 559, and a table opening 555 extending between surfaces 551 and 559. User device 100 may be positioned on top table surface 551, or held above top table surface 551 by any suitable stand assembly 800, for presentation to a user that may have access to top table surface 551, while support module assembly 600 may be positioned below and coupled to bottom table surface 559 (e.g., hidden from a user by table 550), and while at least a portion of cable assembly 399 (e.g., at least a portion of module cable connector subassembly 400) may be provided within table opening 555 for electrically or otherwise coupling user device 100 and support module assembly 600 through table 550. Cable assembly 399 may be provided with any suitable length between user device 100 and support module assembly 600 that may permit a user to grab and move user device 100 (e.g., a portable electronic device, such as an iPhone™ made available by Apple Inc. of Cupertino, Calif.) within a particular range of motion with respect to table 550 (e.g., any suitable relatively fixed structure) and/or stand assembly 800 on which user device 100 may be perched when not being held by a user. Alternatively, a user of user device 100 may not be able to move user device 100 with respect to table 550 and/or stand assembly 800 yet may still be enabled to functionally interact with device 100 (e.g., interface with a user interface application running on device 100). Such a system 1 may be used in a retail store or any other suitable environment where it may be desirable to secure user device 100 and electrically support user device 100 while also allowing user device 100 to be handled by a user.

Platform assembly 500 may also be equipped with one or more features for enabling support module assembly 600 to be easily removed from bottom table surface 559 of table 550 and replaced with another support module subassembly (e.g., to physically upgrade support module assembly 600) while maintaining the position of user device 100 and/or cable assembly 399 with respect to table 550. For example, as shown in FIGS. 2-7, platform assembly 500 may also include a trim component 520 and a bracket component 580. When assembled, an upper portion of trim component 520 may be positioned within table opening 555 and a lower portion of trim component 520 may extend outward from opening 555 at bottom table surface 559 and through a bracket opening 585 in bracket component 580, while bracket component 580 may be coupled to bottom table surface 559 (e.g., bracket component 580 may be coupled to bottom table surface 559 using any suitable features (e.g., screws 582 may be screwed through screw holes 583 in bracket component 580 and into respective screw holes through bottom table surface 559 of table 550)). In some embodiments, trim component 520 may be press fitted into table opening 555 and/or a glue or any other suitable adhesive component may be used to hold trim component 520 within table opening 555.

Once trim component 520 and bracket component 580 may be coupled with respect to table 550 such that platform assembly 500 may be fully assembled, support module assembly 600 may be coupled to platform assembly 500. For example, as also shown in FIGS. 2-7, bracket component 580 may include one or more (e.g., three) hollow bracket legs 589 extending downward from table 550, where, when support module assembly 600 is aligned with and pushed upwardly in the direction of arrow U towards platform assembly 500, each bracket leg 589 of bracket component 580 may be operative to extend through a respective hole 629 through a top enclosure 620 of support module assembly 600, through a respective hole 669 through a substrate or main logic board ("MLB") 660 of support module assembly 600 (e.g., a board that may support some or all electrical components of assembly 600 including module connectors 640 and 700 and any suitable memory and/or processors and/or any other suitable module components of assembly 600), and/or through or at least adjacent to a respective hole 689 through a bottom enclosure 680 of support module assembly 600 (e.g., a bottom enclosure that may combine with top enclosure 620 to protect MLB 660 and/or any other components of assembly 600 from debris or interference or otherwise), and then a respective mounting fastener 690 (e.g., screw or captive fastener or otherwise) of support module assembly 600 may be screwed up through and into a respective bracket leg 589 for removably fastening support module assembly 600 to bracket component 580 of platform assembly 500. Cable module connector subassembly 700 may be electrically coupled to a top surface of MLB 660 and at least each cable module connector contact 710 of cable module connector subassembly 700 may be aligned with and/or exposed through a connector opening 625 in top enclosure 620. Trim component 520 may be shaped to receive at least a portion of module cable connector subassembly 400, such as by a hollow cylindrical shape extending from a top trim surface 521 to a bottom trim surface 529 and defining a trim space 525. Top trim surface 521 may be flush with or just recessed below top table surface 551, while bottom trim surface 529 may extend below bottom table surface 559 and/or below at least a portion of bracket component 580, where, when support module assembly 600 is coupled to bracket component 580, bottom trim surface 529 may be operative to extend down (e.g., through connector opening 625 in top enclosure 620) such that bottom trim surface 529 may be operative to extend about at least a portion (e.g., a cable module connector housing 720) of cable module connector subassembly 700 (see, e.g., FIG. 16), whereby the geometries of trim component 520 and cable module connector subassembly 700 may be operative to key (e.g., properly rotationally orient) at least a portion of platform assembly 500 (and thus a properly interfacing assembly 400) with at least a portion of support module assembly 600), and/or whereby a bottom portion of trim component 520 proximate bottom trim surface 529 may be operative to provide at least a portion of a shield for each cable module connector contact 710 of cable module connector subassembly 700. In some embodiments, trim component 520 and/or bracket component 580 (and/or table 550) may be considered and/or provided as a portion of support module assembly 600.

When support module assembly 600 is coupled to platform assembly 500, such alignment between trim space 525 of trim component 520 and each cable module connector contact 710 of cable module connector subassembly 700 may enable a portion of module cable connector subassembly 400 to be inserted downwardly from above top table surface 551 (e.g., in the direction of arrow D (e.g., along axis A)) through trim space 525 for electrically coupling each module cable connector contact 410 of module cable connector subassembly 400 with a respective cable module connector contact 710 of cable module connector subassembly 700 (see, e.g., FIGS. 3, 5, 6, 15, and 16). As shown, module cable connector subassembly 400 may include a top cap 420 with a strain relief component 422 extending outwardly from top cap 420, and an intermediate o-ring cap 430 (e.g., a stainless steel structure). An upper portion and/or an intermediate portion of intermediate o-ring cap 430 may interlock with a lower portion of top cap 420. A variable orientation of intermediate o-ring cap 430 with respect to top cap 420 and strain relief component 422 may be operative to enable cable subassembly 300 to travel from strain relief component 422 through intermediate o-ring cap 430 at any suitable angle θ (e.g., 90°) and at any suitable rotational orientation R about an axis A (see, e.g., FIG. 18) of assembly 400 (e.g., an axis perpendicular to top table surface 551). An intermediate o-ring 438 (e.g., a rubber o-ring) may be positioned about a lower portion of intermediate o-ring cap 430 and may be operative to facilitate robust retention of module cable connector subassembly 400 within trim space 525 of trim component 520 of platform assembly 500 (e.g., to prevent any pulling out (e.g., any unintentional pulling out) of module cable connector subassembly 400 from platform assembly 500 (e.g., in a direction of arrow U opposite the direction of arrow D (e.g., along axis A)), which may trip a security alarm of system 1) and/or to prevent any fluid ingress downward from top table surface 551 into module cable connector subassembly 400 and/or support module assembly 600.

Module cable connector subassembly 400 may also include a rear or top electromagnetic interference ("EMI") gasket 440 that may abut a bottom surface of intermediate o-ring cap 430, a boot cable crimp 442 (e.g., a stainless steel crimp) that may be operative to crimp about cable subassembly 300 adjacent a module end of cable subassembly 300 and/or to act as a rear or top EMI shield with top EMI gasket 440 thereabout. In some embodiments, top EMI gasket 440 may be sandwiched between a bottom surface of intermediate o-ring cap 430 and a top surface of an extension surface 442e of boot cable crimp 442 that may extend perpendicularly out from a hollow cylindrical body of boot cable crimp 442 (see, e.g., FIG. 20). Module cable connector subassembly 400 may include a wire comb 450 below boot cable crimp 442 that may guide a module conductor end 329 of each cable conductor 320 of cable subassembly 300 to a respective electrical coupling location at a respective module cable connector contact 410 of a plug board 470 (e.g., at a top end of plug board 470) for electrical coupling (e.g., soldering) of the module conductor end 329 to the module cable connector contact 410 at the electrical coupling location, while an inner mold 460 (e.g., a molded structure of polypropylene ("PP") and/or of polyethylene ("PE")) may be provided to protect one, some, or each electrical coupling (e.g., electrical coupling between a respective conductor end 329 and a respective contact 410). Module cable connector subassembly 400 may include a front or bottom EMI gasket 480 that may abut a bottom surface of inner mold 460. Additionally, module cable connector subassembly 400 may include a plug boot 490 (e.g., a stainless steel structure) that may be operative to provide an EMI shield and enclosure to at least a portion of cable subassembly 300. For example, plug boot 490 may be any suitable structure of any suitable shape that may be shaped to receive a portion of cable subassembly 300, such as by a hollow cylindrical or tubular or other shape extending from a top plug boot open end or surface 491 to a bottom plug boot open end or surface 499 and defining a plug boot space 495 with an interior surface 493 of the structure of boot 490. The structure of boot 490 may be operative to house within plug boot space 495 (e.g., enclose or surround on all or substantially all sides except on top and bottom) at least a bottom portion of intermediate o-ring cap 430 and/or top EMI gasket 440 and/or at least a bottom portion of boot cable crimp 442 and/or wire comb 450 and/or inner mold 460 and/or at least a top portion of plug board 470 between top plug boot surface 491 and bottom plug boot surface 499. Bottom EMI gasket 480 may also be positioned at least partially within plug boot space 495 or may be positioned outside of plug boot space 495 but with a top surface of gasket 480 against or across or proximately adjacent to bottom plug boot surface 499, such that top EMI gasket 440 (with or without crimp 442), plug boot 490, and bottom EMI gasket 480 may together be operative to provide an EMI cage and enclosure for protecting portions of cable subassembly 300 and/or portions of module cable connector subassembly 400 from electromagnetic interference (e.g., for protecting one, some, or each electrical coupling between a respective conductor end 329 and a respective contact 410 (e.g., the electrical coupling location of one, some, or each conductor 320/contact 410 electrical coupling as may be positioned within plug boot space 495)). Each one of gaskets 440 and 480 may be any suitable material. For example, top EMI gasket 440 may be a foam gasket or a gasket made of fabric over foam, while bottom EMI gasket 480 may be a compressible silicon gasket that may be impregnated with one or more metal pieces (e.g., a metal band within gasket 480) or shore 50 STEM and/or foam and/or fabric over foam.

An exterior surface 494 of plug boot 490 may include any suitable trim-mating feature(s) 492 (e.g., groove(s) and/or projection(s)) that may be operative to align with and/or mate and/or otherwise interact with any suitable boot-mating feature(s) 522 (e.g., groove(s) and/or projection(s)) that may be provided on an interior surface of trim component 520 defining trim space 525, such that plug boot 490 may be properly mated with trim component 520 within trim space 525 when plug boot 490 may be inserted in the direction of arrow D (e.g., along axis A) from above top table surface 551 down into trim space 525 of trim component 520. Interaction of features 492 and 522 may be operative to properly orient plug boot 490 and trim component 520 with respect to one another for a rotational orientation R about an axis A and/or for a linear orientation along axis A. Moreover, when support module assembly 600 is coupled to bracket component 580 and when module cable connector subassembly 400 is positioned within platform assembly 500 (e.g., when plug boot 490 is properly positioned within trim space 525 for electrically coupling each module cable connector contact 410 of plug board 470 of module cable connector subassembly 400 with a respective cable module connector contact 710 of cable module connector subassembly 700), a bottom portion of bottom EMI gasket 480 may be operative to mate with (e.g., within an internal periphery of and/or about an external periphery of) a top portion of a shield shell component 740 of cable module connector subassembly 700 and/or compress against a top portion of shield shell component 740 of cable module connector subassembly 700 (see, e.g., FIG. 16), which may enable bottom EMI gasket 480 to provide at least a portion of an EMI shield (e.g., along with shell component 740 and/or trim component 520) for shielding electrical signal communication coupling(s) between each module cable connector contact 410 of module cable connector subassembly 400 of cable assembly 399 and each respective cable module connector contact 710 of cable module connector subassembly 700 of support module assembly 600.

Additionally, as mentioned, when plug boot 490 may be properly positioned within trim space 525 of trim component 520, intermediate o-ring 438 may be operative to facilitate robust retention of module cable connector subassembly 400 within trim space 525 (e.g., to prevent any pulling out (e.g., any unintentional pulling out) of module cable connector subassembly 400 from platform assembly 500 (e.g., in a direction of arrow U opposite the direction of arrow D (e.g., along axis A))). In some embodiments, rather than provided by an o-ring (e.g., a silicone o-ring), ring 438 may be provided by a c-ring (e.g., a stainless-steel c-ring spring that is not continuous but discontinuous), which may be operative to provide an audible and/or tactile click when subassembly 400 is inserted for retention within trim space 525. When module cable connector subassembly 400 is properly positioned within and retained by platform assembly 500, a bottom surface of top cap 420 of module cable connector subassembly 400 may be operative to lie on top table surface 551 about table opening 555 and/or on a portion of top trim surface 521 of trim component 520, and/or a bottom surface of an intermediate portion of intermediate o-ring cap 430, which may be positioned under and/or within a portion of top cap 420, may be operative to lie on top table surface 551 about table opening 555 and/or on a portion of top trim surface 521 of trim component 520 (see, e.g., FIG. 6) and/or a top trim crown 523 of platform assembly 500. In such embodiments, a height H of top cap 420 may be operative to define a height of module cable connector subassembly 400 positioned above table 550 of platform assembly 500 when module cable connector subassembly 400 is properly coupled to platform assembly 500, such that only a limited portion of module cable connector subassembly 400 (e.g., cap 420 and strain relief component 422) may be exposed to or visible by a user of system 1 (e.g., a user interacting with device 100 above top table surface 551) and such that no portion of trim component 520 and/or no portion of bracket component 580 and/or no portion of support module assembly 600 may be exposed to or visible by such a user of system 1. Strain relief component 422 may be formed in any suitable manner by any suitable material(s) (e.g., a thermoplastic copolyester elastomer ("TPC-ET") material overmold structure) that may allow a flexibility for cable subassembly 300 as cable subassembly 300 enters/exits module cable connector subassembly 400 (e.g., to reduce damage to cable subassembly 300), while top cap 420 may be formed in any suitable manner from any suitable material(s) (e.g., a more rigid innermold structure (e.g., polycarbonate(s) ("PC") and/or polybutylene terephthalate(s) ("PBT")) with or without a less rigid outermold structure (e.g., thermoplastic elastomer(s) ("TPE")), or a single stainless steel structure with or without a soft protective overmold), such that an external surface of top cap 420 may be resistant to dents.

Figure 6:
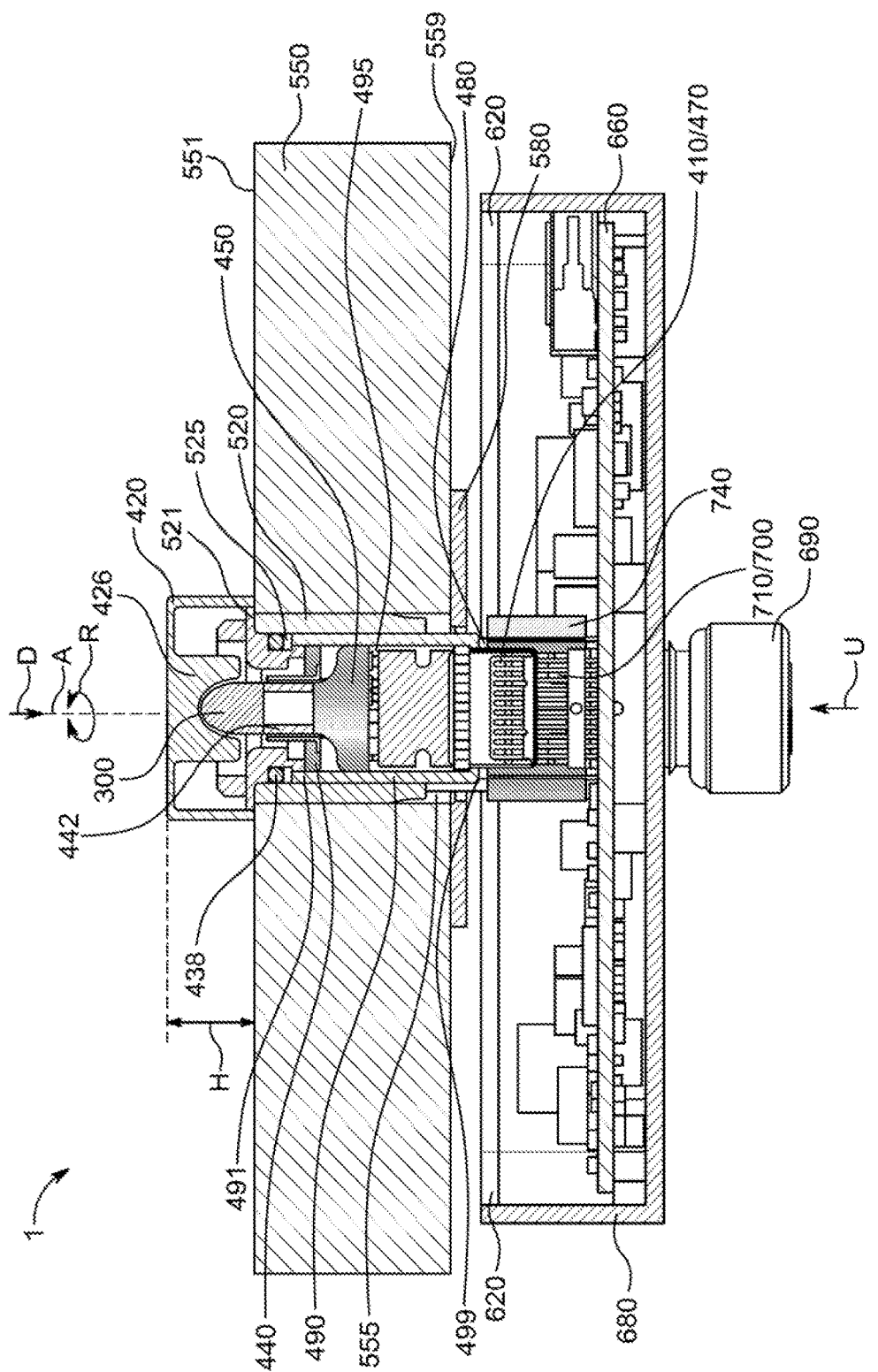
FIG. 6 is a cross-sectional view of the system of FIGS. 1-5 when fully assembled.
Figure 6A:
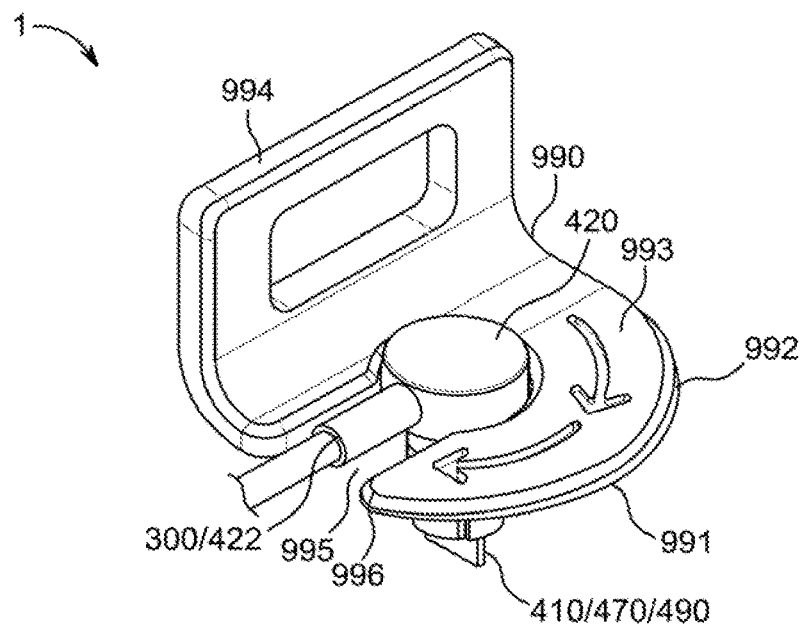
FIG. 6A is a top perspective view of removal tool interacting in a first stage of interaction with a portion of the system of FIGS. 1-6 when fully assembled.
Figure 6B:
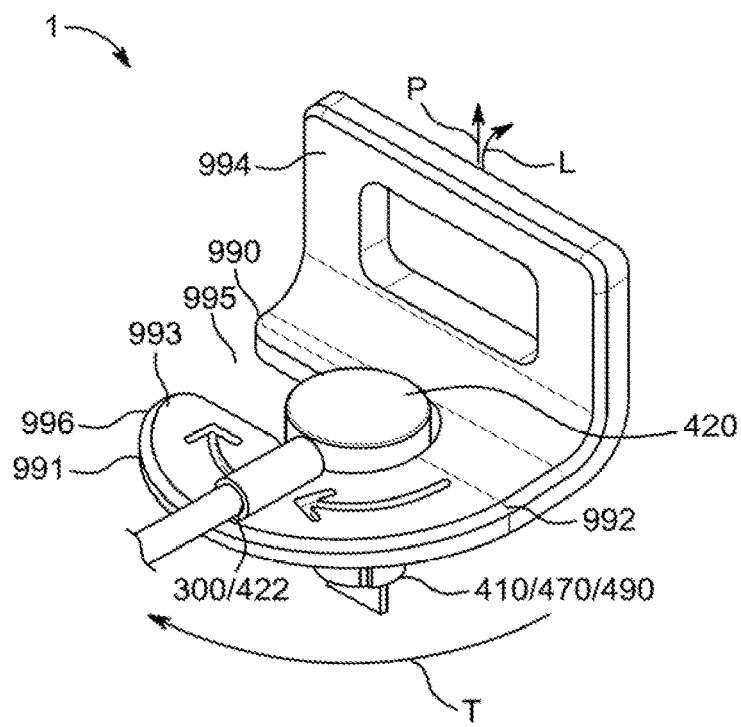
FIG. 6B is a top perspective view of the removal tool of FIG. 6A interacting in a second stage of interaction with a portion of the system of FIGS. 1-6A when fully assembled.
Figure 6C:
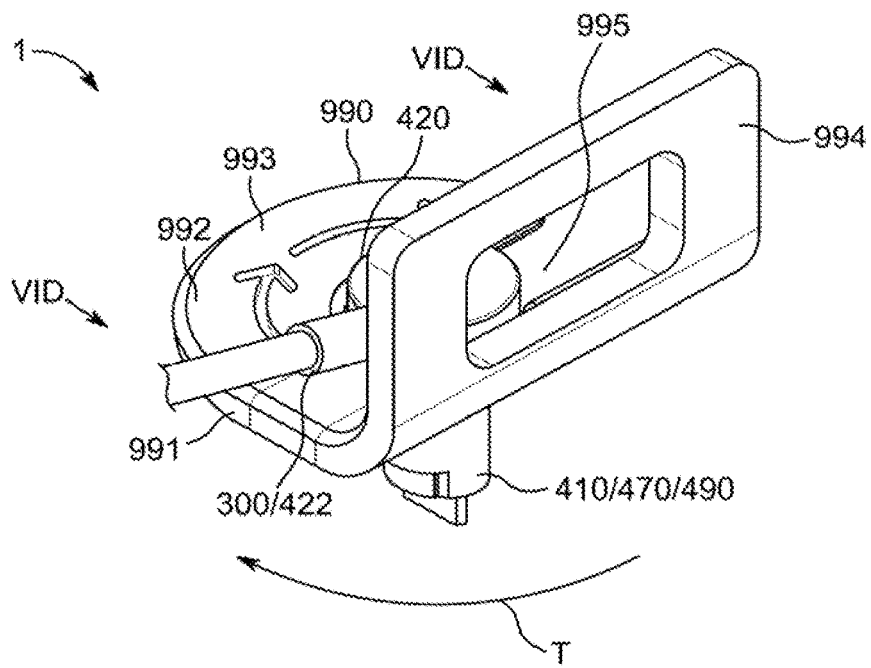
FIG. 6C is a top perspective view of the removal tool of FIGS. 6A and 6B interacting in a third stage of interaction with a portion of the system of FIGS. 1-6B when fully assembled.
Figure 6D:
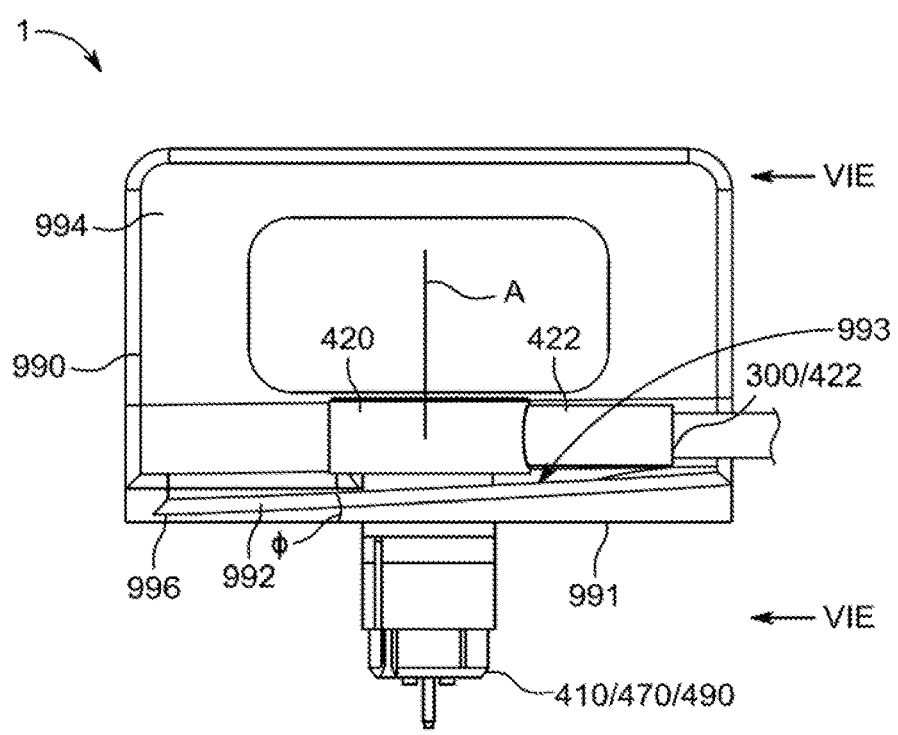
FIG. 6D is a side view of the removal tool of FIGS. 6A-6C interacting in the third stage of interaction with a portion of the system of FIGS. 1-6C when fully assembled, taken from line XID-XID of FIG. 6C.
Figure 6E:
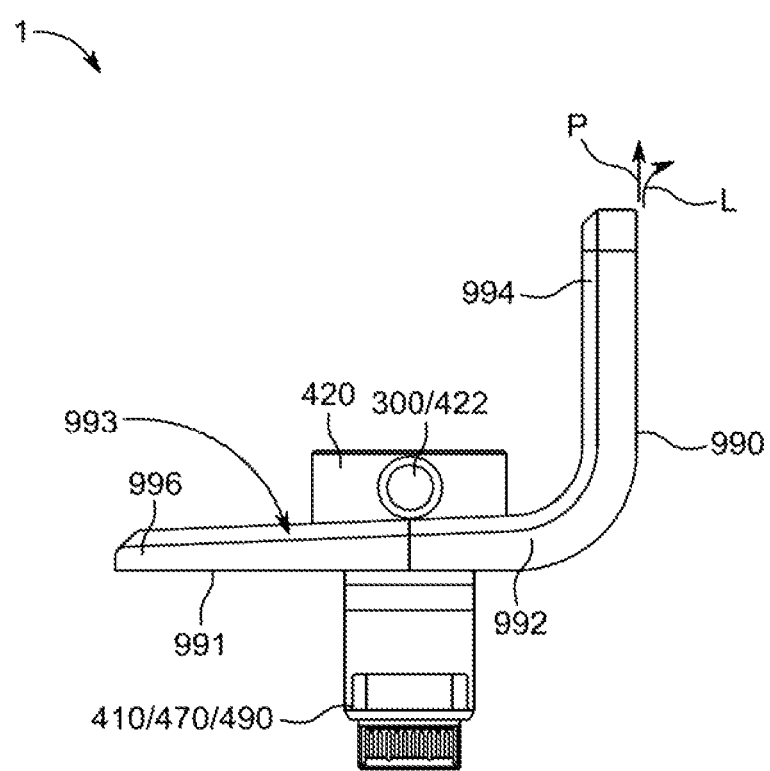
FIG. 6E is a side view of the removal tool of FIGS. 6A-6D interacting in the third stage of interaction with a portion of the system of FIGS. 1-6D when fully assembled, taken from line XIE-XIE of FIG. 6D.

As shown in FIGS. 6A-6E, a removal tool 990 may be used to remove module cable connector subassembly 400 (e.g., top cap 420, strain relief component 422, module cable connector contact 410, plug board 470, and/or plug boot 490) from trim component 520 and cable module connector subassembly 700 within table 550 (not shown in FIGS. 6A-6E). Removal tool 990 may include a wedge portion 992 and a handle portion 994 extending upward or at any suitable angle away from wedge portion 992. Wedge portion 992 may include a table surface 991 and an opposite ramp surface 993. Wedge portion 992 may also include a slot 995 that may enable a portion of module cable connector subassembly 400 (e.g., top cap 420) to be positioned therein when table surface 991 of removal tool 990 is slid along top table surface 551 such that slot 995 may partially surround module cable connector subassembly 400 (e.g., as shown in FIG. 6A). Next, removal tool 990 may be rotated about module cable connector subassembly 400 (e.g., in the direction of arrow T about axis A of top cap 420) such that a leading face 996 of wedge portion 992 (e.g., at an intersection of table surface 991 and opposite ramp surface 993) may be advanced underneath a portion of module cable connector subassembly 400 (e.g., underneath a portion of top cap 420 and/or underneath a portion of strain relief component 422 and/or of cable subassembly 300 extending from top cap 420), such as from the position of FIG. 6A to the position of FIG. 6B and/or to the position of FIGS. 6C-6E. An inclination (e.g., angle Φ) of ramp surface 993 with respect to table surface 991 may be any suitable magnitude that may gradually or otherwise increase the thickness of wedge portion 992 between surfaces 991 and 993, such that the thickness of wedge portion 992 between top table surface 551 and a portion of module cable connector subassembly 400 (e.g., a portion of top cap 420 and/or of strain relief component 422 and/or of cable subassembly 300) may increase as removal tool 990 may be further rotated about module cable connector subassembly 400 (e.g., in the direction of arrow T about axis A). For example, as shown between the configuration of FIG. 6A and the configuration of FIG. 6B (e.g., when tool 990 is rotated about 90° or any other suitable amount about axis A in the direction of arrow T), strain relief component 422 may engage ramp surface 993 such that a portion of wedge portion 992 may be positioned between table 550 and module cable connector subassembly 400, whereby a user may then tilt removal tool 990 (e.g., handle portion 994) in the direction of arrow L and/or lift up removal tool 990 (e.g., handle portion 994) in the direction of arrow P for removing module cable connector subassembly 400 (e.g., module cable connector contact 410, plug board 470, and/or plug boot 490) from trim component 520 and/or cable module connector subassembly 700 and further away from top table surface 551 of table 550. Additionally or alternatively, as shown between the configuration of FIG. 6A and the configuration of FIGS. 6C-6E (e.g., when tool 990 is rotated about 180° or any other suitable amount about axis A in the direction of arrow T), strain relief component 422 may engage ramp surface 993 such that a portion of wedge portion 992 may be positioned between table 550 and module cable connector subassembly 400, whereby a user may then tilt removal tool 990 (e.g., handle portion 994) in the direction of arrow L and/or lift up removal tool 990 (e.g., handle portion 994) in the direction of arrow P for removing module cable connector subassembly 400 (e.g., module cable connector contact 410, plug board 470, and/or plug boot 490) from trim component 520 and/or cable module connector subassembly 700 and further away from top table surface 551 of table 550. The inclination of tool 990 and/or the speed at which tool 990 may be rotated about subassembly 400 and/or the angle and/or speed with which tool 990 may be tilted or lifted with respect to table 550 for removal of subassembly 400 may be chosen to minimize or obviate any potential damage to system 1 during the removal process. Tool 990 may be any suitable material, such as molded plastic, stainless steel, and/or the like.

Figure 6F:
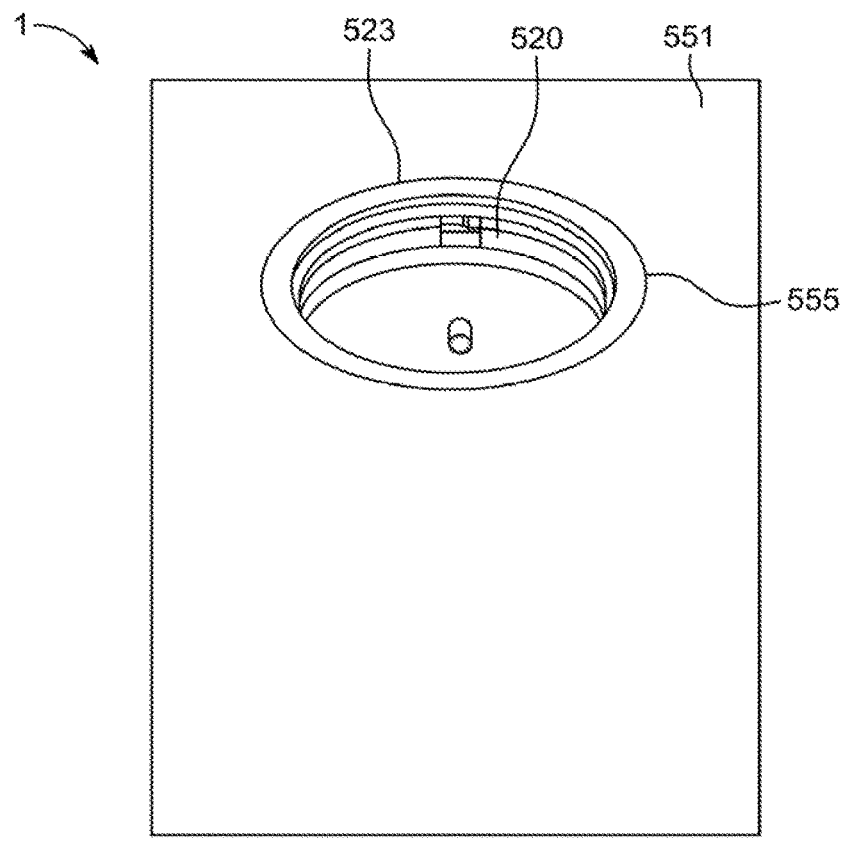
FIG. 6F is a top perspective view of a portion of the system of FIGS. 1-6 with the table of FIGS. 1, 2, and 4-6.
Figure 6G:
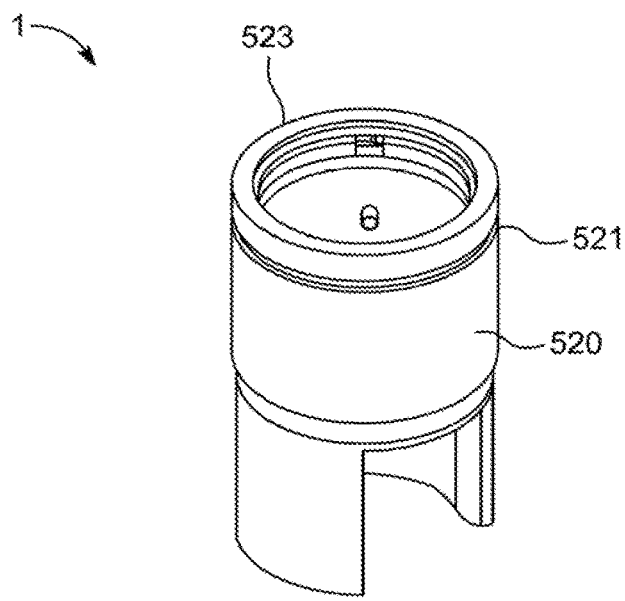
FIG. 6G is a top perspective view of a portion of the system of FIGS. 1-6 and 6F without the table of FIGS. 1, 2, and 4-6.
Figure 6H:
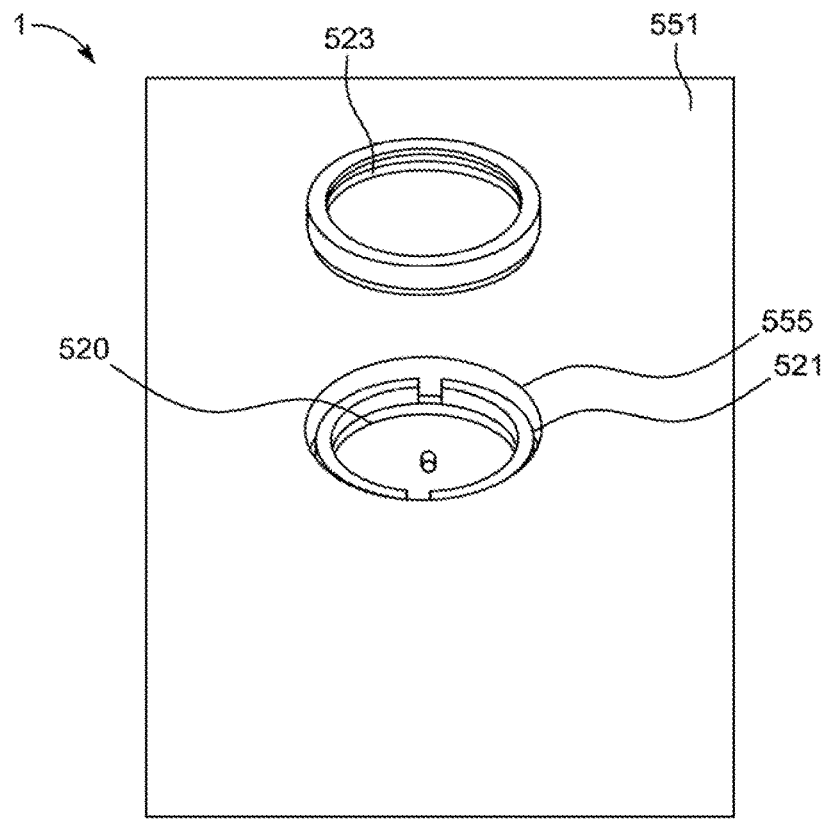
FIG. 6H is an exploded top perspective view of a portion of the system of FIGS. 1-6 with the table of FIGS. 1, 2, and 4-6.
Figure 6I:
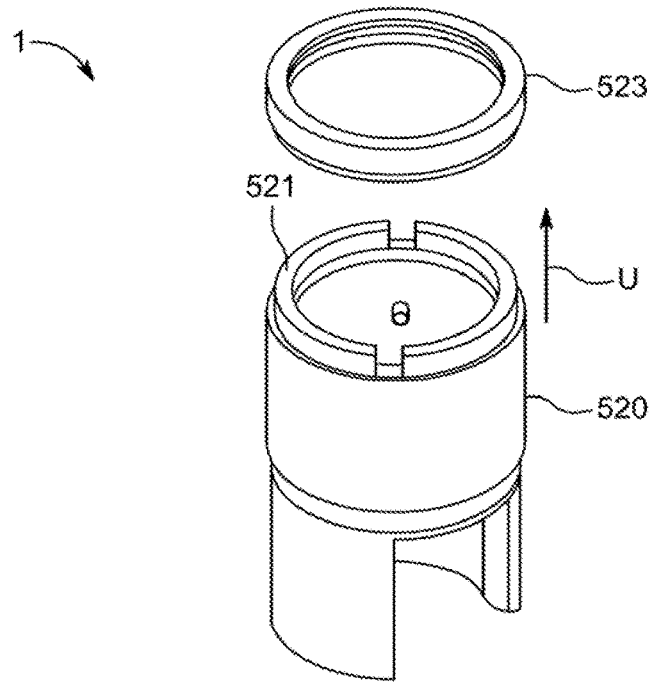
FIG. 6I is an exploded top perspective view of a portion of the system of FIGS. 1-6 and 6F without the table of FIGS. 1, 2, and 4-6.
Figure 7:
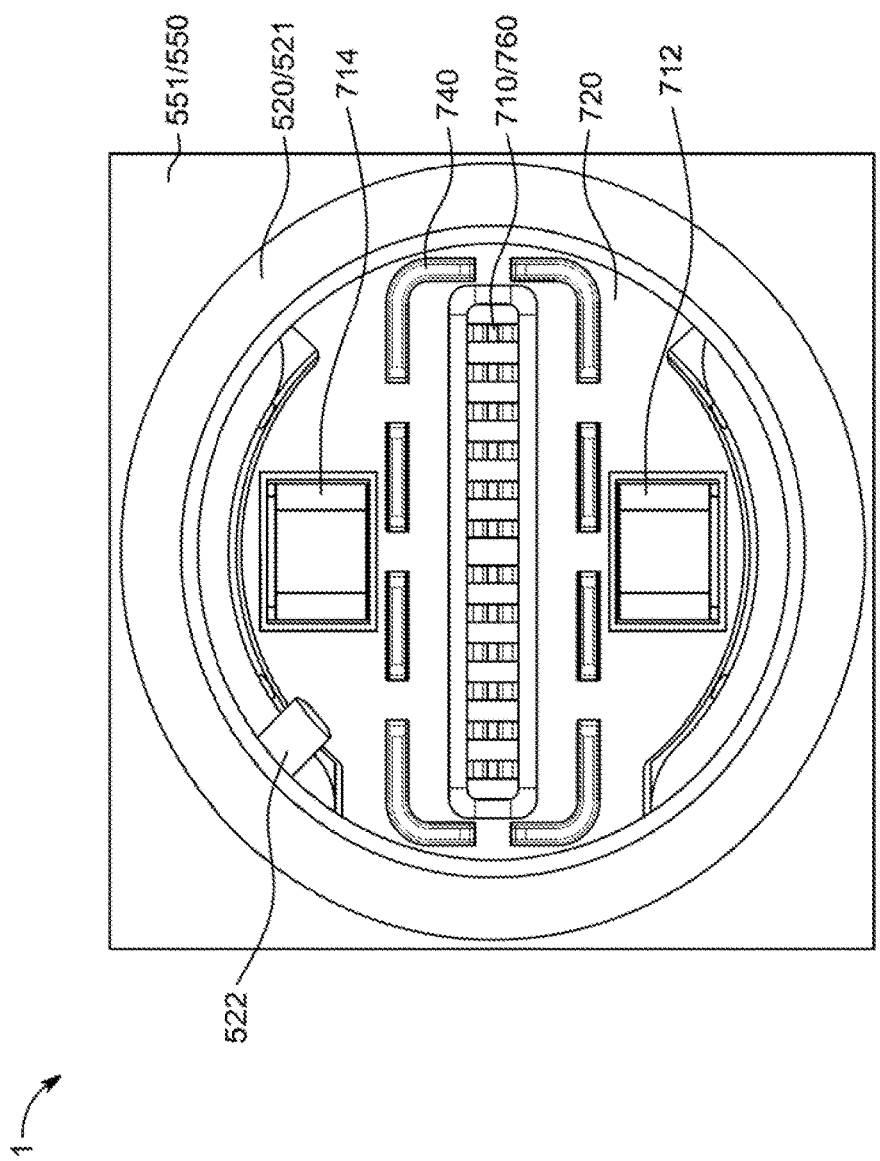
FIG. 7 is a top view of a portion of the system of FIGS. 1-6 when partially assembled.
Figure 8:
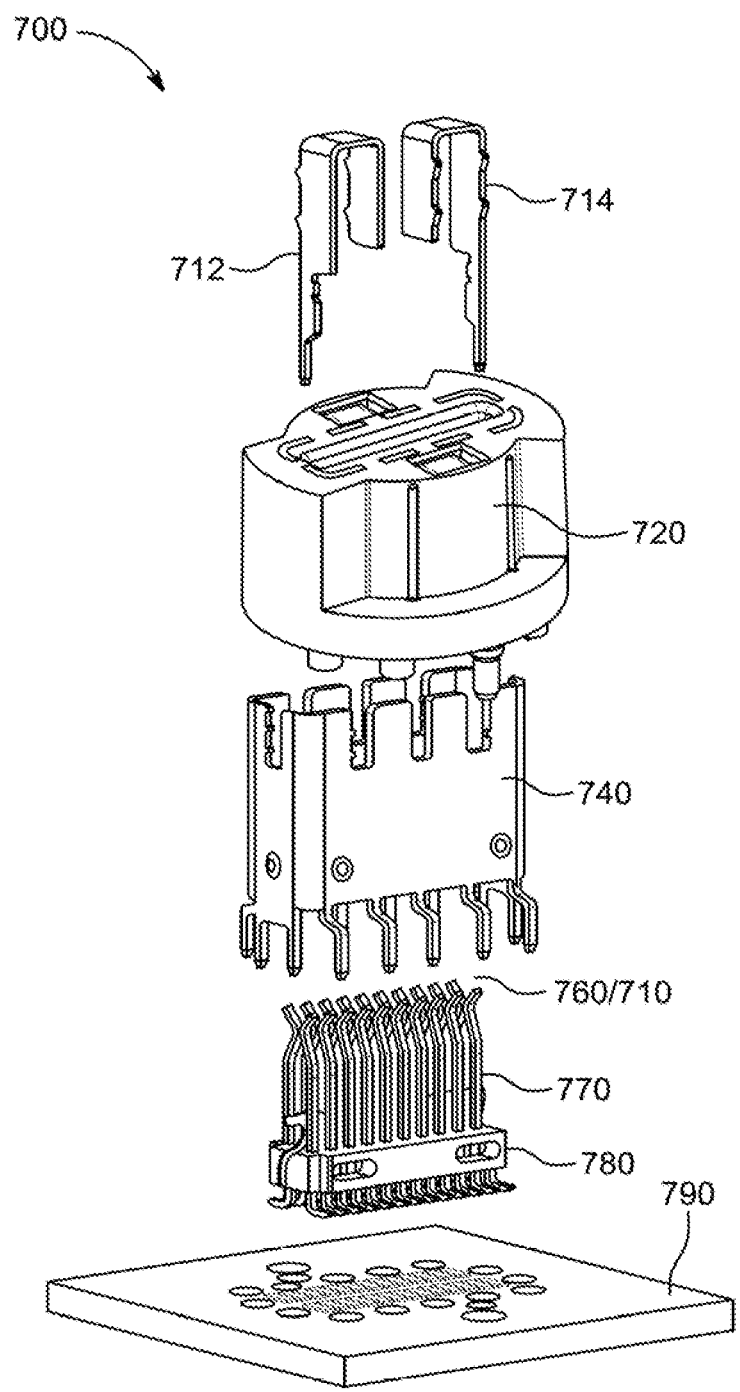
FIG. 8 is an exploded top perspective view of a cable module connector of the system of FIGS. 1-7.
Figure 9:
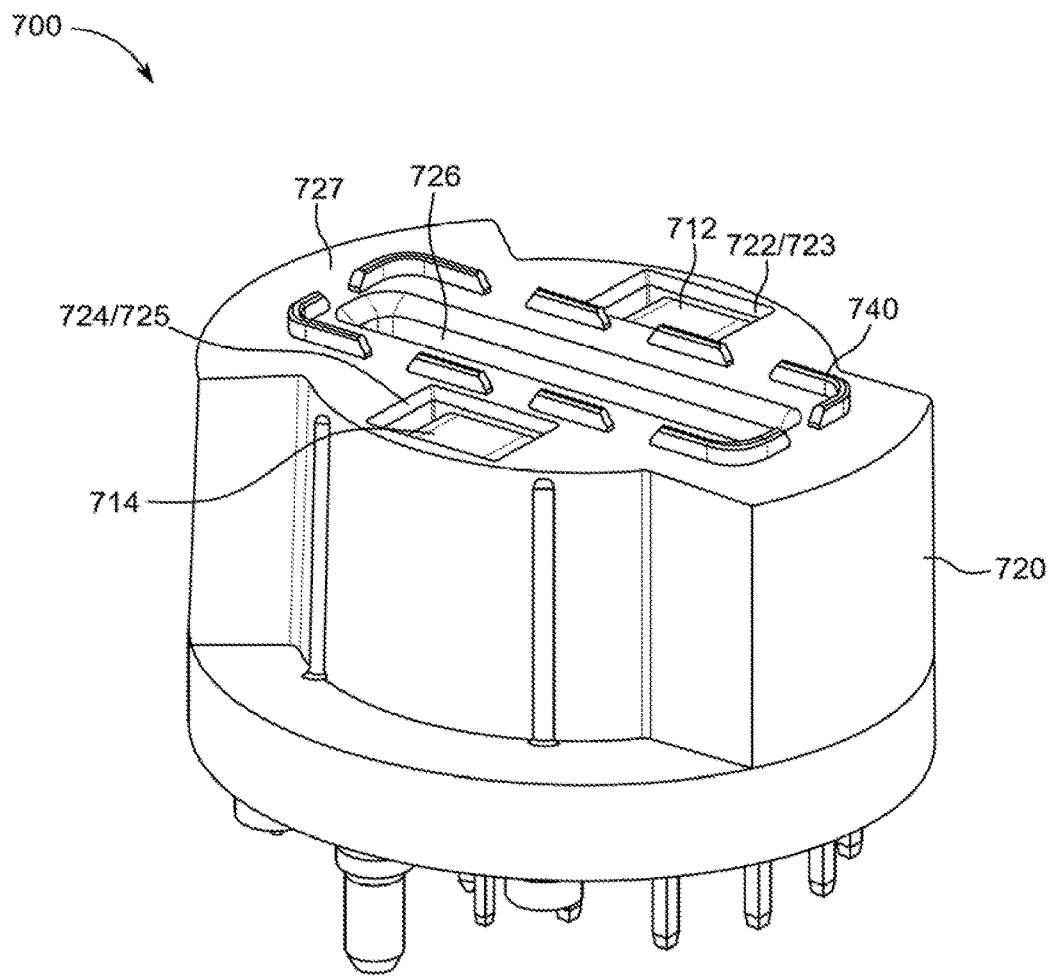
FIG. 9 is a perspective view of the cable module connector of FIG. 8 when fully assembled.
Figure 10:
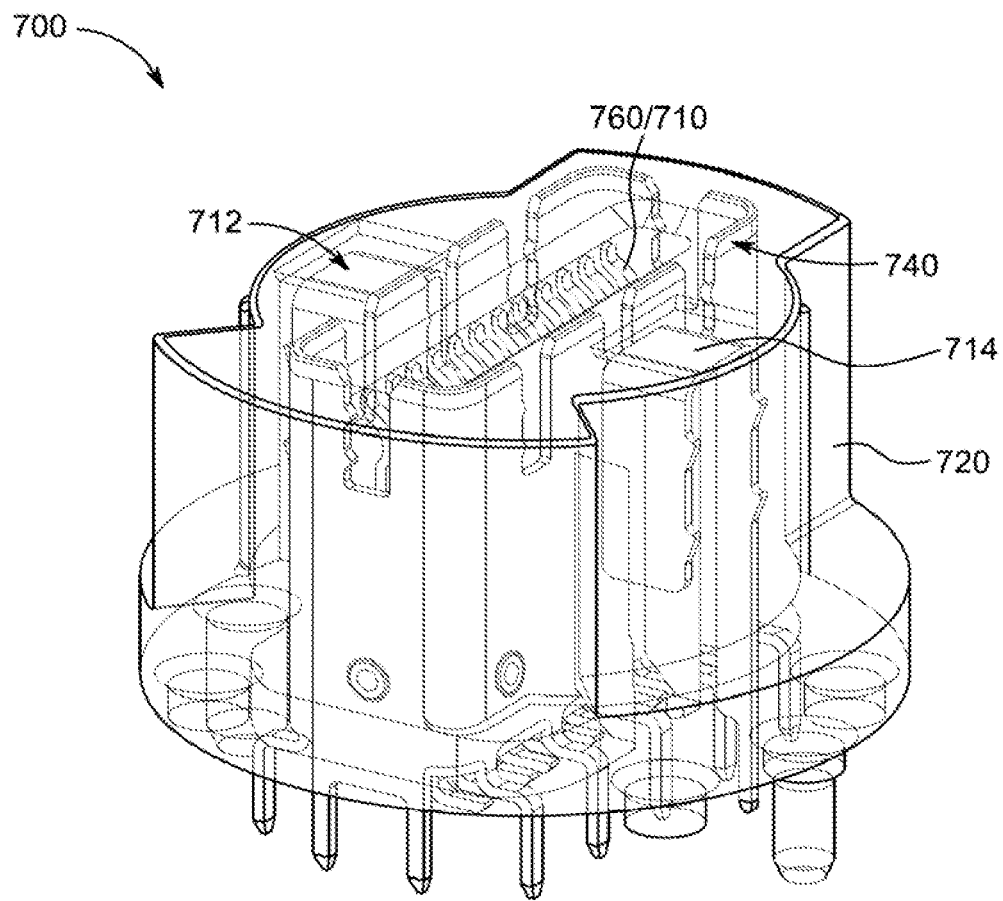
FIG. 10 is another perspective view of the cable module connector of FIGS. 8 and 9 when fully assembled and with a housing of the cable module connector partially transparent.
Figure 11:
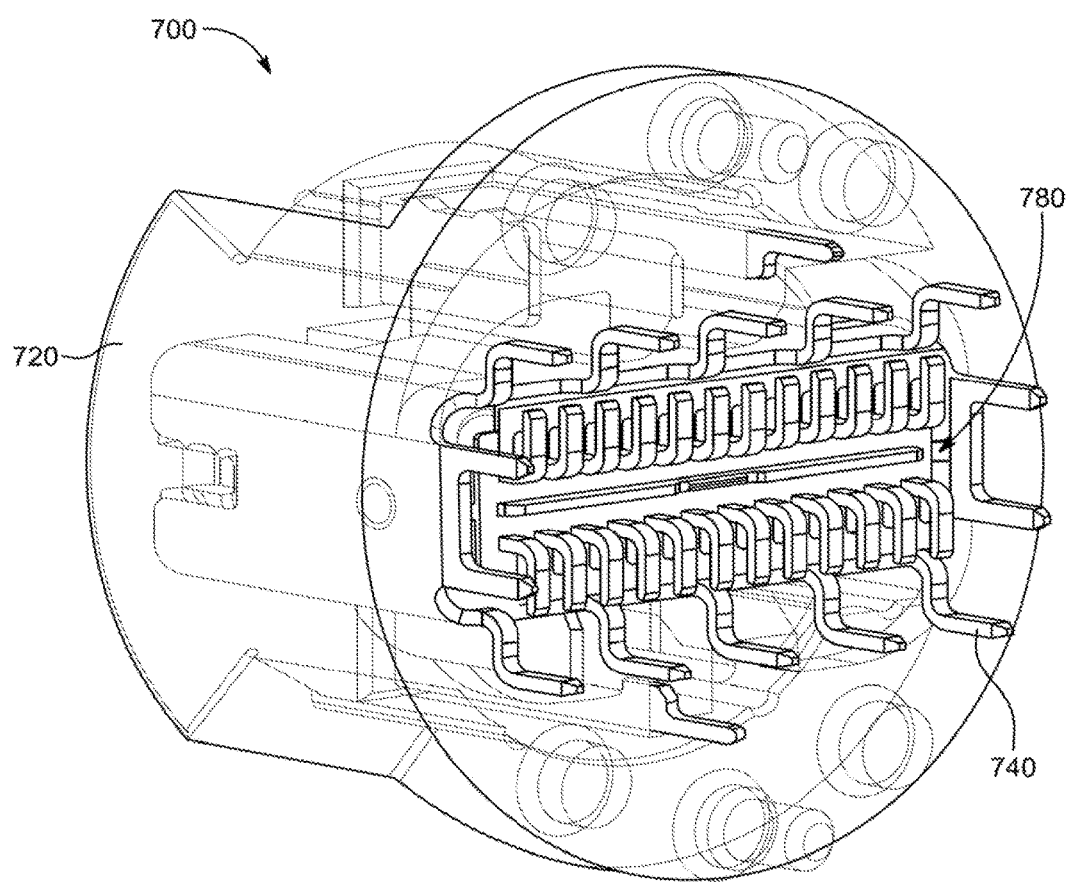
FIG. 11 is yet another perspective view of the cable module connector of FIGS. 8-10 when fully assembled and with a housing of the cable module connector partially transparent.
Figure 12:
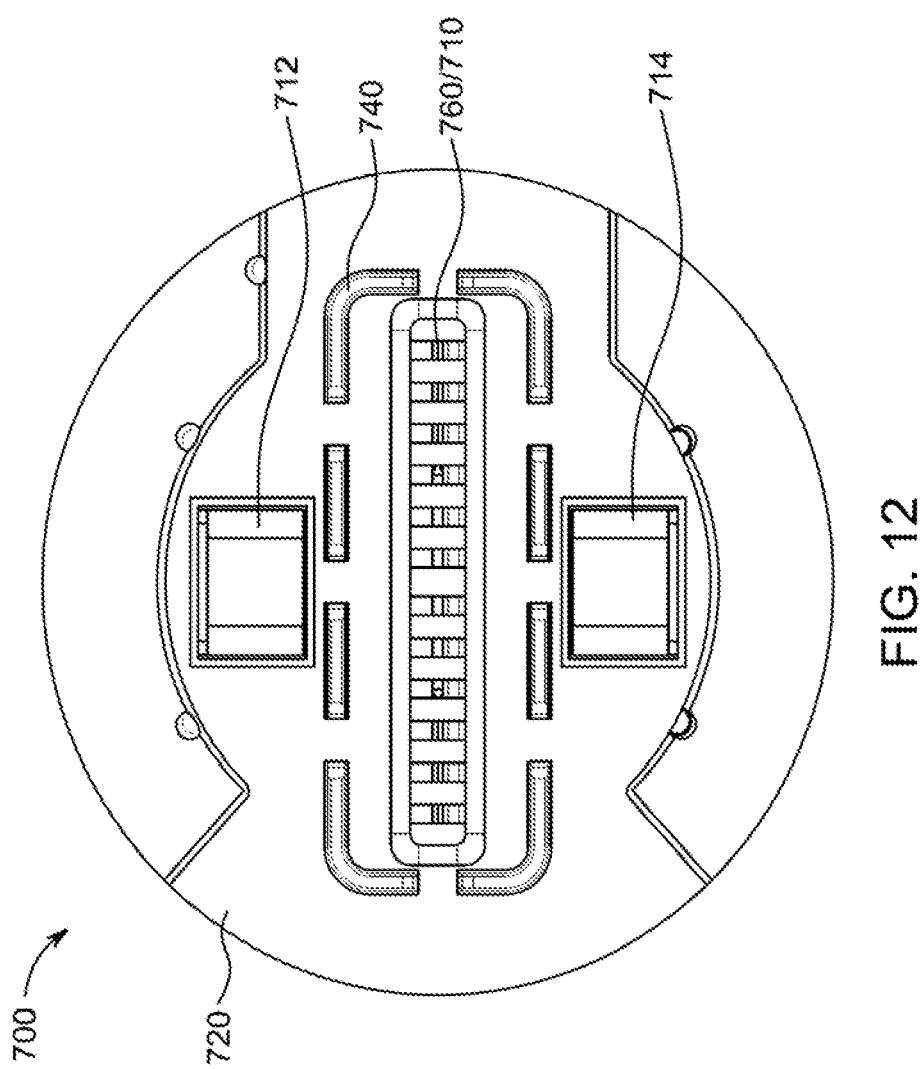
FIG. 12 is a top view of the cable module connector of FIGS. 8-11 when fully assembled.
Figure 13:
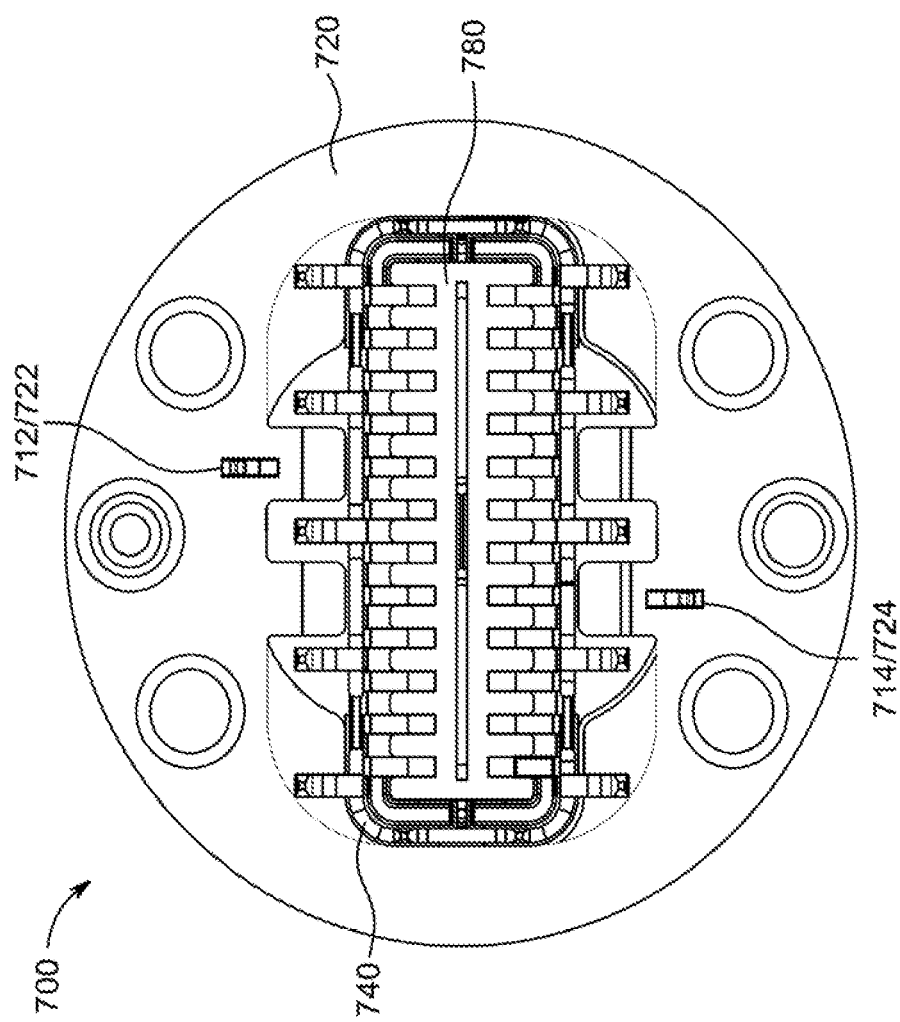
FIG. 13 is a bottom view of the cable module connector of FIGS. 8-12 when fully assembled.
Figure 14:
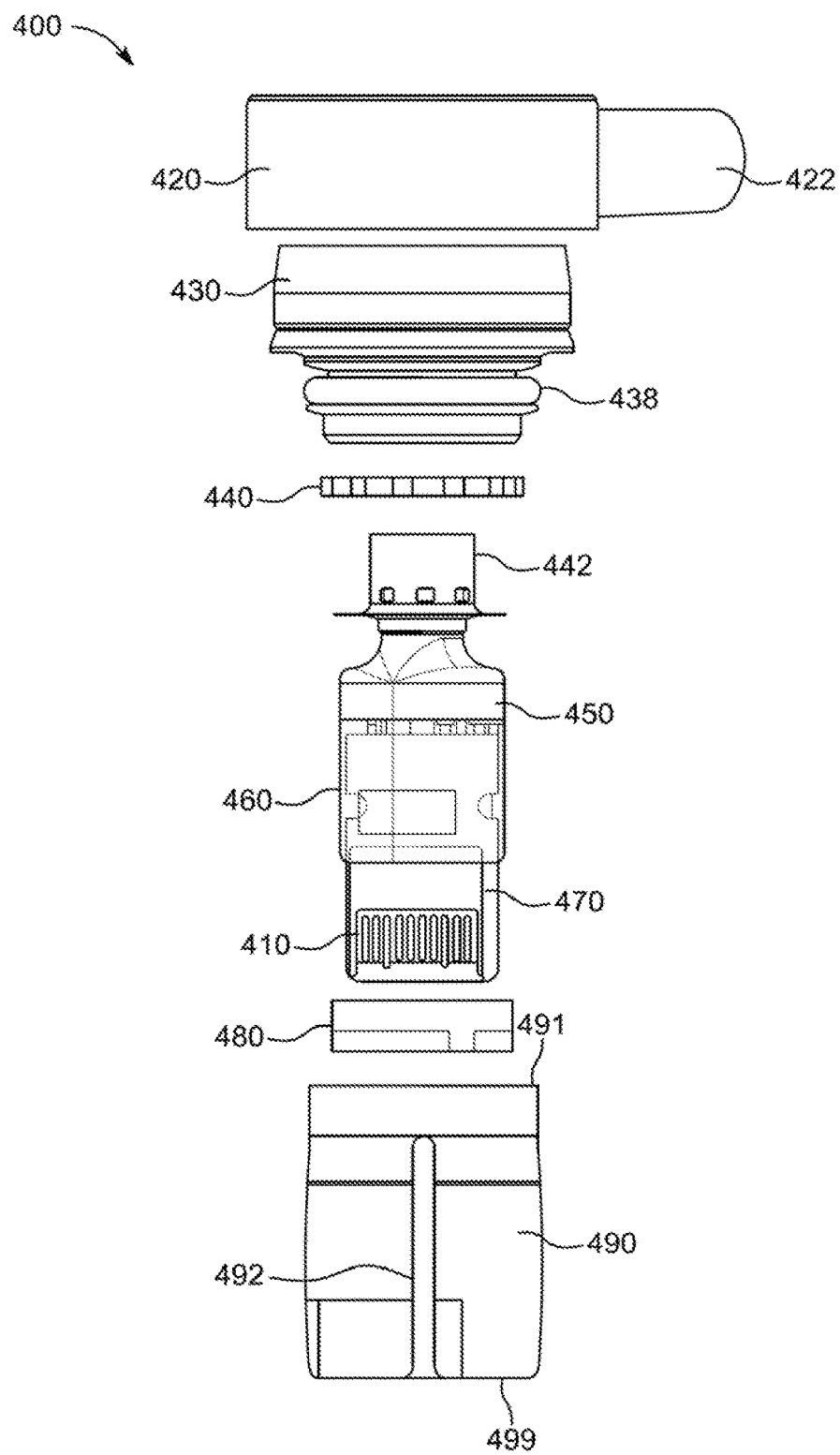
FIG. 14 is an exploded side view of a module cable connector subassembly of the system of FIGS. 1-7.
Figure 15:
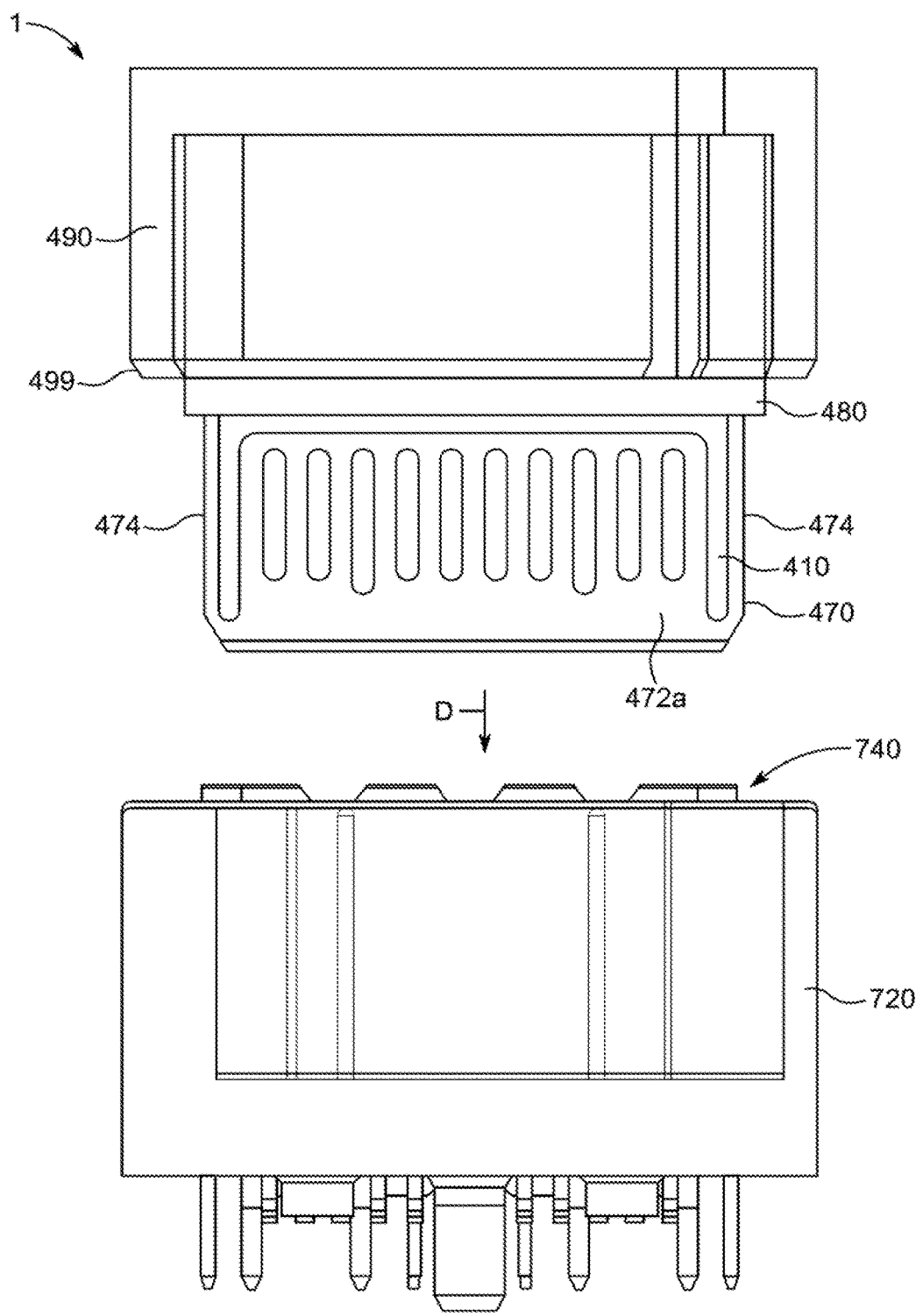
FIG. 15 is a side view of the module cable connector subassembly of FIG. 14 and the cable module connector of FIGS. 8-13 while not electrically interfacing.
Figure 16:
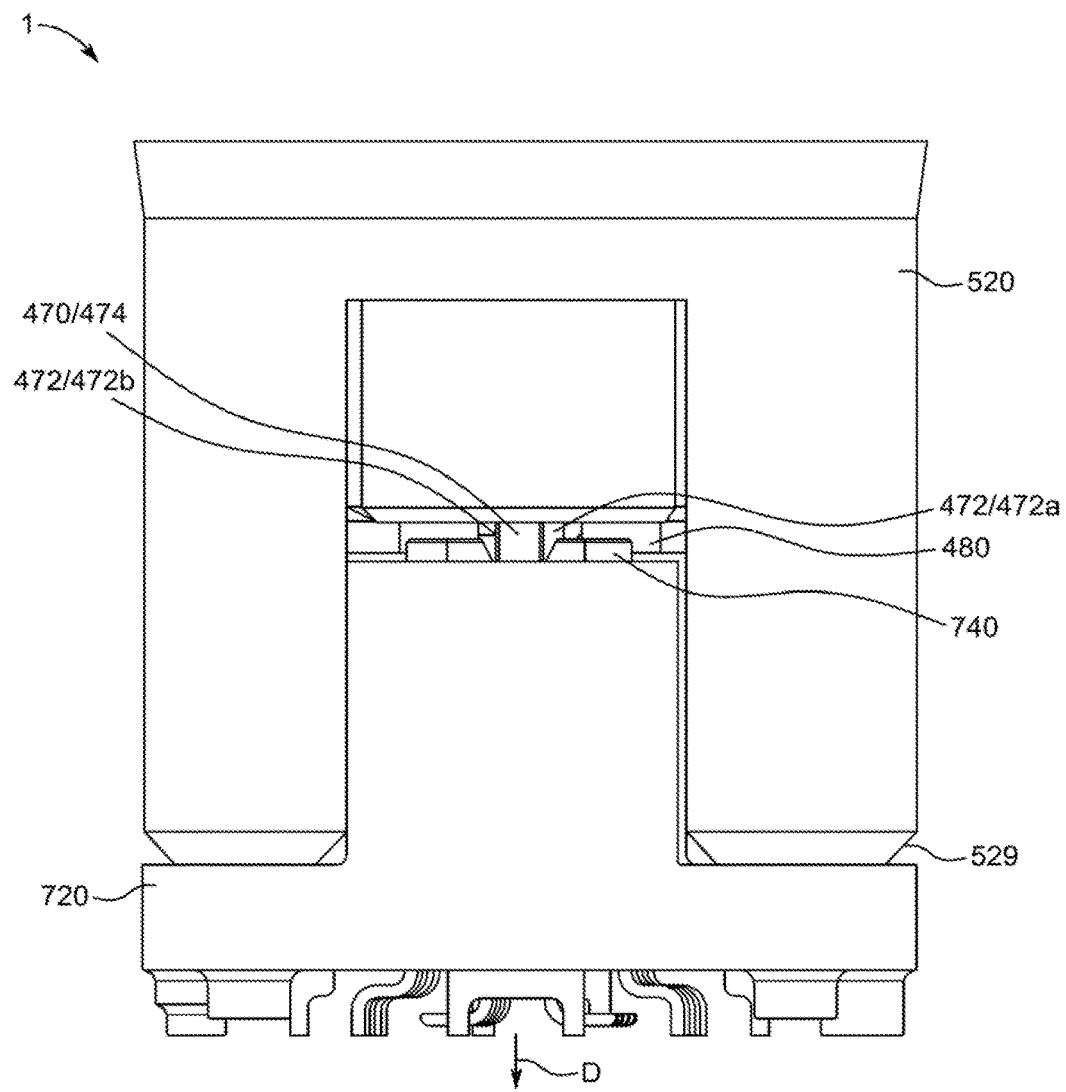
FIG. 16 is another side view of the module cable connector subassembly of FIGS. 14 and 15 and the cable module connector of FIGS. 8-13 and 15 while electrically interfacing.

As shown in FIGS. 6F-6I, system 1 may include a top trim crown 523, such as a replaceable cosmetic component, that may be coupled to trim component 520. For example, top trim crown 523 may be coupled to trim component 520 using any suitable coupling mechanism when a light fit force is applied downwardly on crown 523 (e.g., such that a portion of crown 523 may extend on top of and along top trim surface 521 of trim component 520). In some embodiments, one or more crush-ribs of crown 523 may be used to attach crown 523 to trim component 520, while any suitable tool may be used to remove crown 523 from trim component 520 (e.g., in the direction of arrow U of FIG. 6I). While trim component 520 may be installed (e.g., permanently) within opening 555 of table 550 (e.g., as shown in FIGS. 6F and 6H, where top trim surface 521 of trim component 520 may be positioned slightly below top table surface 551), crown 523 may be removably coupled to trim component 520 (e.g., as shown in FIG. 6F, a top surface of crown 523 may be flush with top table surface 551 when coupled to trim component 520). Crown 523 may be replaced and/or temporarily removed from system 1 for any suitable purpose, such as when crown 523 has been damaged or dirtied or when top table surface 551 may need to be refinished (e.g., painted, sanded, glossed, etc.). Crown 523 may be any suitable material, such as stainless steel, copper, plastic, and/or the like and/or may be any suitable color, such as a color that matches top table surface 551. In some embodiments, top trim crown 523 may be annular (as shown) for exposing trim space 525 for enabling insertion of subassembly 400 therethrough. Alternatively, top trim crown 523 may be a solid disk (not shown) that may cover trim space 525, thereby preventing debris from entering trim space 525 when not in use for accepting subassembly 400 therein.

Figure 19:
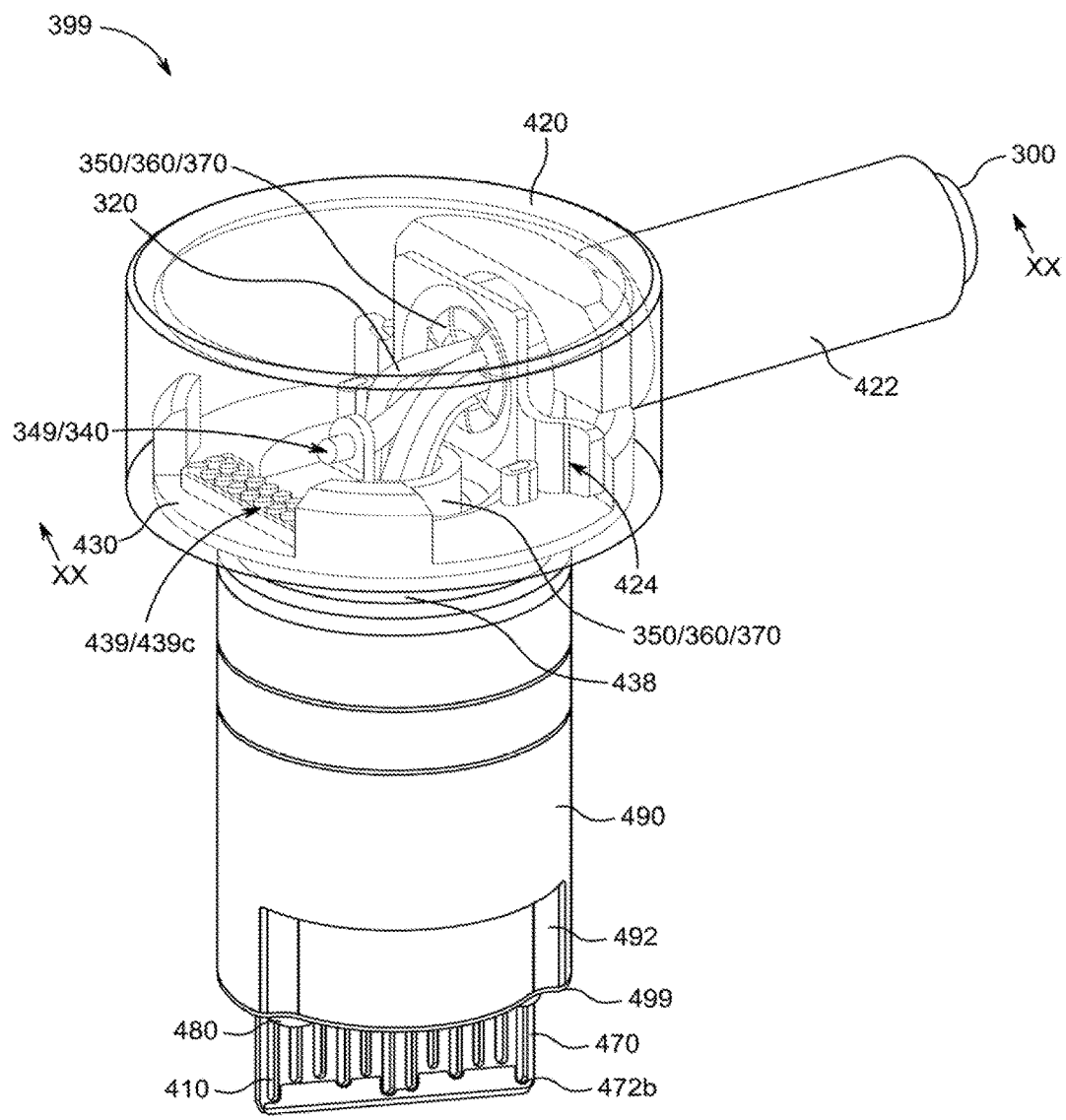
FIG. 19 is a top perspective view of a portion of the module cable connector subassembly of FIGS. 14-18A with a top cap partially transparent.
Figure 20:
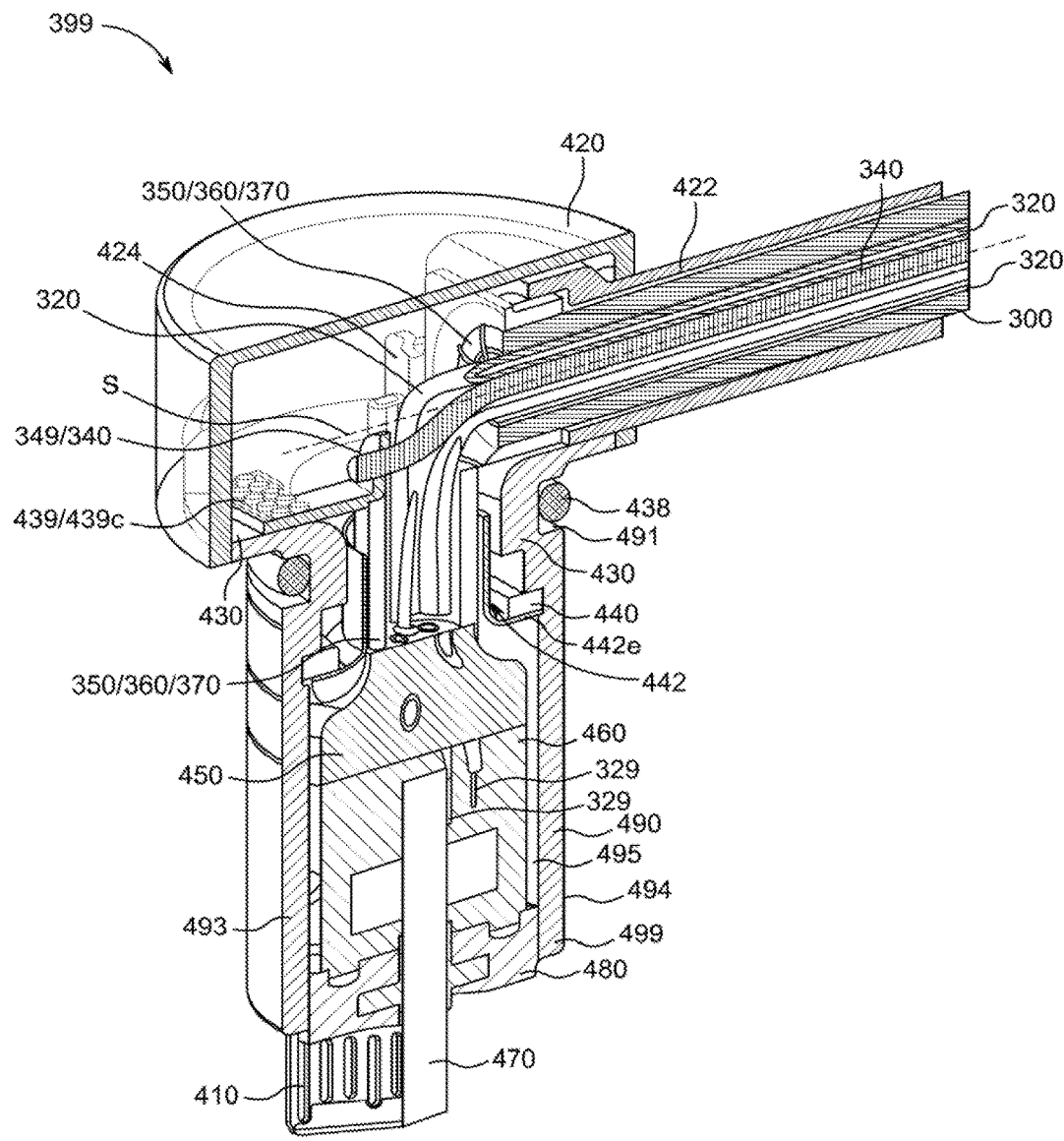
FIG. 20 is a cross-sectional view of a portion of the module cable connector subassembly of FIGS. 14-19 with a top cap partially transparent, taken from line XX-XX of FIG. 19.

Strain relief component 422 and a portion of cable subassembly 300 therethrough may extend outwardly from top cap 420 at any suitable orientation with respect to top table surface 551, such as parallel to top table surface 551 (e.g., at a 90° angle θ with respect to axis A, as shown), or at any suitable angle up away from top table surface 551 or at any suitable angle down towards top table surface 551. For example, as shown in FIGS. 6, 18, and 18A, top cap 420 may include a bend feature 426 (e.g., extending downward from an internal surface of the top wall of top cap 420) that may promote a bend angle for cable subassembly 300 from axis A through boot cable crimp 442 to axis S of strain relief component 422 (e.g., a bend angle within a plane including axes A and S), where bend feature 426 may include one or more sculpted ribs 426r that may grip into an external cover of cable subassembly 300 (e.g., a cover 370) for promoting the bend angle within top cap 420. As shown in FIGS. 19 and 20, where bend feature 426 may not be shown, a top cable crimp 424 (e.g., a stainless steel crimp) may be provided within top cap 420 and may be operative to crimp about cable subassembly 300 and then strain relief component 422 may be operative to be slid over a portion of top cable crimp 424 and/or top cable crimp 424 may be operative to abut or be adjacent to a portion of strain relief component 422 (e.g., within top cap 420). Top cable crimp 424 may be coupled to any suitable portion (e.g., a top surface) of intermediate o-ring cap 430 and/or to any suitable portion of strain relief component 422 and/or to any suitable portion of top cap 420. As shown, a portion of cable subassembly 300 (e.g., a portion of a cable cover 370 and/or a portion of a sheath 360 and/or a portion of a tape 350) may be removed or otherwise non-existent along a portion of a length of cable subassembly 300 between top cable crimp 424 and boot cable crimp 442, such that the bend angle of cable subassembly 300 within module cable connector subassembly 400 may be easier to achieve (e.g., met with less resistance by the material of cable subassembly 300) and/or such that a module memory cable end 349 of a memory cable component 340 of cable subassembly 300 may not follow the bend angle of one or more conductors 320 of cable subassembly 300 but may be terminated at a coupling with intermediate o-ring cap 430 and/or top cap 420 and/or otherwise external to plug boot space 495 of plug boot 490. For example, as shown in FIGS. 19 and 20, module memory cable end 349 of memory cable component 340 may be coupled (e.g., fixed (e.g., crimped)) to a memory cable termination component 439 that may be any suitable structure integrated with or coupled (e.g., fixed (e.g., through laser weldings 439*c*)) to intermediate o-ring cap 430 (e.g., to a top surface of intermediate o-ring cap 430 under top cap 420). As shown in FIGS. 19 and 20, a portion of memory cable component 340 proximate module memory cable end 349 may bend away with any suitable bend from a longitudinal axis of another portion of memory cable component 340 (e.g., downward out from axis 5), where such a bend may be made prior to terminating proximate module memory cable end 349 to memory cable termination component 439, such that the termination may be operative to better resist any memory cable torsion through increased mechanical advantage of the bend. Any suitable bend may be provided at one or each termination end of memory cable component 340 (see, e.g., module memory cable end 349 and/or a device memory cable end 341 of FIG. 22).

Although a rotational orientation about axis A between plug board 470 and plug boot 490 may be fixed (e.g., by a shape of a portion of plug boot space 495) such that each contact 410 of plug board 470 may functionally align with a respective contact 710 of cable module connector subassembly 700 when plug boot 490 and support module assembly 600 are each properly coupled to platform assembly 500, a rotational orientation about axis A between plug board 470 and strain relief component 422 may be any suitable angle in a 360° rotational orientation range as strain relief component 422 may extend from any suitable portion of a side surface of top cap 420. The rotational orientation for cable subassembly 300 from axis A through cable crimp 442 to axis S of strain relief component 422 about axis A (e.g., when looking downward on top cap 420 and top table surface 551) may be defined by the clocking of bend feature 426 of top cap 420 with respect to plug board 470 and/or with respect to plug boot 490. Alternatively, strain relief component 422 and/or cable subassembly 300 may be configured to extend outward from top cap 420 through a top surface of top cap 420 (e.g., in the direction of arrow U). Various components of module cable connector subassembly 400 may be provided with any suitable shape and/or size for facilitating an electrical coupling between contact(s) 410 of plug board 470 and conductor(s) 320 of any suitable cable subassembly 300 of any suitable size and/or shape and/or type (e.g., a cable subassembly with an outer diameter of 4.6 millimeters or less, or more in some embodiments, with any suitable number of conductors).

Module cable connector subassembly 400 may be assembled in any suitable fashion. For example, in some embodiments, a straight or linear portion of cable subassembly 300, which may include one or more module conductor ends 329 of one or more cable conductors 320 and module memory cable end 349 of a memory cable component 340, may be provided. Then wire comb 450 may be provided to arrange at least one module conductor end 329 of at least one cable conductor 320 such that each of such end(s) 329 may be electrically coupled to plug board 470, and then inner mold 460 may be provided about wire comb 450 and/or end(s) 329 and/or a portion of plug board 470. Boot cable crimp 442 may be crimped about cable subassembly 300 above inner mold 460 and/or wire comb 450. Then plug board 470 and inner mold 460 and/or any other portion of the assembly may be slid into space 495 of plug boot 490 and gaskets 440 and 480 may be positioned. Then a portion of cable subassembly 300 may be passed through intermediate o-ring cap 430, a bend portion may be formed in a portion of cable subassembly 300 while top cap 420 may be provided for finishing assembly 400.

Plug board 470 may be configured to include any suitable number of module cable connector contacts 410, such as twenty-four contacts 410 (e.g., twelve contacts 410 on each of two opposite contact surfaces 472 (e.g., surfaces 472*a* and 472*b*) of plug board 470 (see, e.g., FIGS. 15-17A and 19)), which may be the same number of contacts as a universal serial bus ("USB") Type-C (or USB-C) reversible-plug connector for the USB Type-C specification (e.g., such that plug board 470 may be operative to provide a USB Type-C connector or a superset of a USB Type-C connector). However, it is to be understood that plug board 470 may have any suitable number of contacts 410 that may be more than or fewer than twenty-four. Similarly, any suitable number of conductors 320 may be provided by cable subassembly 300, one, some, or each of which may be coupled at a respective cable module conductor end 329 to any suitable respective contact 410 or the same contact 410 of plug board 470 (e.g., depending on the type of cable subassembly used and/or the type of plug board 470 used and/or the type of cable module connector subassembly 700. However, as shown, plug board 470 may be configured to include twenty-four contacts 410. The signal pin arrangement for pins or contacts 410 of plug board 470 may be the same as or similar to that of the pins of a USB-C cable connector. However, in some embodiments, as shown in FIG. 17, for example, one pair of two non-SuperSpeed differential pairs of pins (e.g., the pin pair including the position 2 negative ("Dn2") pin and the position 2 positive ("Dp2") pin) of the USB-C cable connector may be replaced with one or two security pins (e.g., a first security pin SEC1 and a second security pin SEC2) that may be used by system 1 to enhance the security (e.g., in a retail environment) of device 100 (e.g., by activating an alarm of system 1 based on a change in signal detection or interruption on one or both of the channels of those security pins). As shown in a difference between surfaces 472*a* and 472*b* of respective FIGS. 17A and 19, security pins SEC1 and SEC2 of contacts 410 on surface 472*b* may extend longer than the SuperSpeed differential pair of pins on surface 472*a* (e.g., the pin pair including the position negative ("D−") pin and the position positive ("D+") pin). Such additional length may promote longer contact between security pins SEC1 and SEC2 of contacts 410 and contacts 710 of cable module connector subassembly 700, which may help avoid causing a false security alarm if there is any slight movement between contacts 410 and 710.

One or more physical alterations to a plug board of a USB-C cable connector may be made to realize plug board 470 of module cable connector subassembly 400. For example, as shown in FIG. 17A, plug board 470 may have any suitable board width PBW, such as a board width in a range between 5.11 millimeters and 9.49 millimeters or a board width of 7.30 millimeters (e.g., 0.60 millimeters greater than a board width of 6.70 millimeters for a USB-C cable connector), one, some, or each contact 410 of plug board 470 may have any suitable contact width CW, such as a contact width in a range between 0.21 millimeters and 0.39 millimeters or a contact width of 0.30 millimeters (e.g., 0.05 millimeters greater than a contact width of 0.25 millimeters for a USB-C cable connector), and/or a pitch distance between any two contacts 410 of plug board 470 may have any suitable pitch distance PD, such as a pitch distance in a range between 0.42 millimeters and 0.78 millimeters or a pitch distance of 0.60 millimeters (e.g., 0.10 millimeters greater than a pitch distance of 0.50 millimeters for a USB-C cable connector), where any larger geometry may help alleviate any manufacturing tolerance concerns between contacts 410 of plug board 470 and respective contacts 710 of cable module connector subassembly 700. Additionally or alternatively, as shown in FIG. 17A, plug board 470 may not include any retention notches in either of two opposite side surfaces 474 of plug board 470 (e.g., surfaces extending between contact surfaces 472 of plug board 470), unlike the retention notches that may be provided on similar side surfaces of a USB-C cable connector, as retention of plug board 470 with respect to cable module connector subassembly 700 may be achieved through the retention of each one of retention of cable module connector subassembly 700 and support module assembly 600 and module cable connector subassembly 400 with respect to platform assembly 500. Elimination of such retention notches may enable reduction in the height (e.g., Z-height) and/or any other suitable dimension(s) of plug board 470 (e.g., as compared to a common USB-cable connector plug board).

As shown in FIGS. 6-13, for example, cable module connector subassembly 700 may include one or more pogo pin contacts (e.g., for power and/or ground), such as pogo pin contacts 712 and 714 (e.g., copper alloy contacts with gold plating), a cable module connector housing 720 (e.g., a nylon structure with a percentage of (e.g., 30%) glass fiber), a shell 740 (e.g., a metal (e.g., stainless steel) shell structure with a nickel underplate), a contact structure 760 (e.g., a copper alloy structure with gold plating) that may provide one, some, or each cable module connector contact 710 (e.g., twenty-four contacts 710), a ground plate structure 770 (e.g., a metal (e.g., stainless steel) ground plate structure), a molded structure 780 (e.g., a nylon molded (e.g., insert molded) structure with a percentage of (e.g., 30%) glass fiber), and/or a printed circuit board ("PCB") 790 (e.g., a PCB of MLB 660 of assembly 600). Each pogo pin contact may be positioned within a respective pogo pin receptacle in housing 720 as may be accessed through a respective pogo pin receptacle opening in a top surface of housing 720, such as pogo pin contact 712 may be positioned with a pogo pin receptacle 722 through opening 723, while pogo pin contact 714 may be positioned with a pogo pin receptacle 724 through opening 725. Contact structure 760 may be positioned within a contact structure receptacle 726 of housing 720, while shell 740 may be positioned within a shell receptacle 727 of housing 720. Like module cable connector subassembly 400, cable module connector subassembly 700 may be similar to a USB-C cable connector.

Cable module connector subassembly 700 may be assembled in any suitable fashion. For example, in some embodiments, shell 740 may be inserted into shell receptacle 727 of housing 720, such as from a bottom surface of housing 720, where a top portion of shell 740 may extend upward out and away from a top surface of housing 720 (e.g., to interact with gasket 480, as mentioned). Then, contact structure 760, which may be fitted with ground plate structure 770 and molded structure 780, may be pressed into contact structure receptacle 726 of housing 720, such as from a bottom surface of housing 720, where a top portion of contact structure receptacle 726 may be accessed via a top surface of housing 720 (e.g., accessed at an appropriate time by plug board 470 such that contact(s) 410 of plug board 470 may interface (e.g., electrically couple) with contact(s) 710 of contact structure 760). Then each pogo pin contact may be pressed into its respective pogo pin receptacle of housing 720, such as from a top surface of housing 720. Then, electrical contacts of contact structure 760 and/or one or each pogo pin and/or shell 740 may be electrically coupled (e.g., via surface-mount technology ("SMT")) to respective portions of PCB 790 and/or passed through respective openings in PCB 790.

Figure 21:
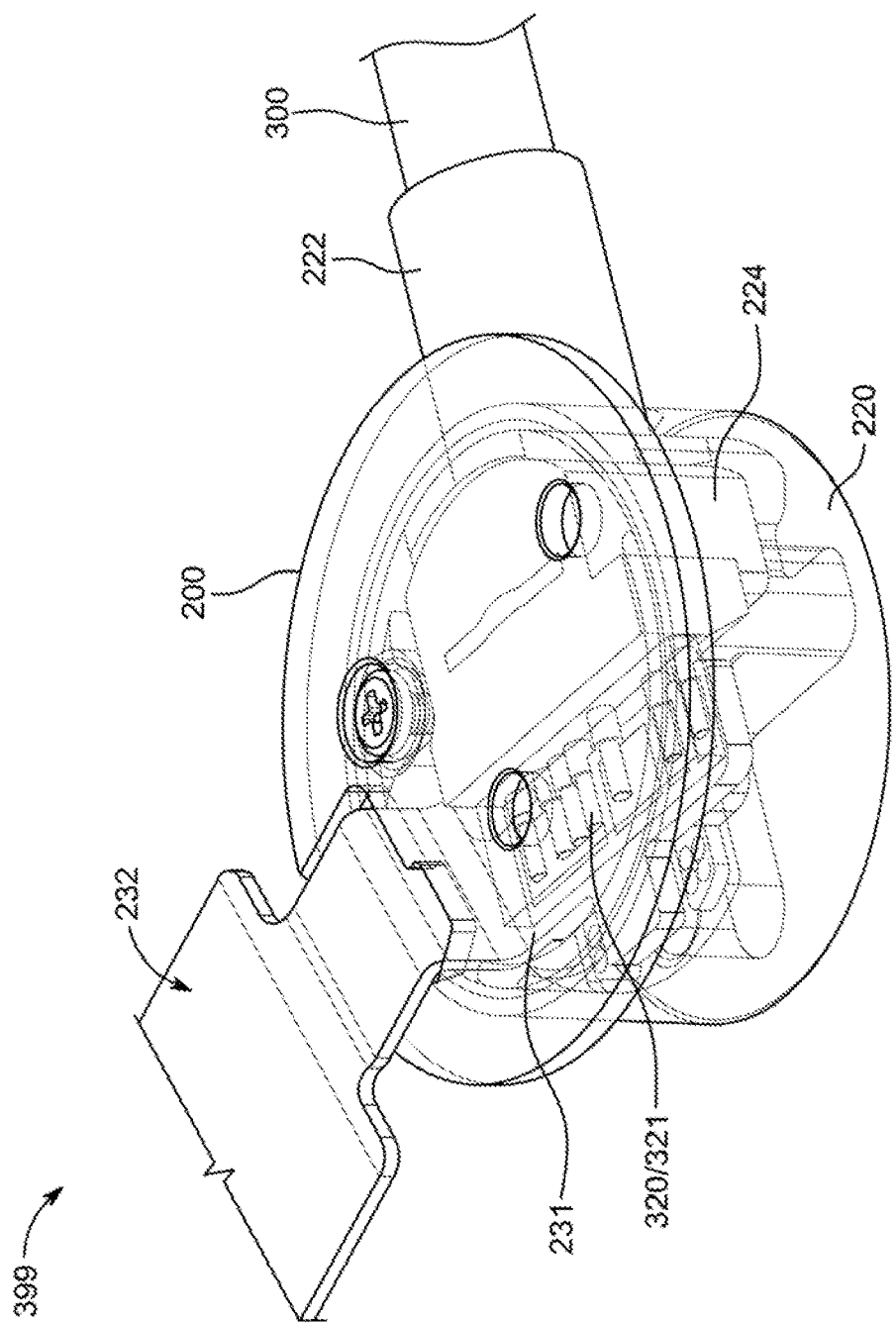
FIG. 21 is a top perspective view of a portion of a device cable connector subassembly of the system of FIGS. 1-7 with a cap component partially transparent.
Figure 22:
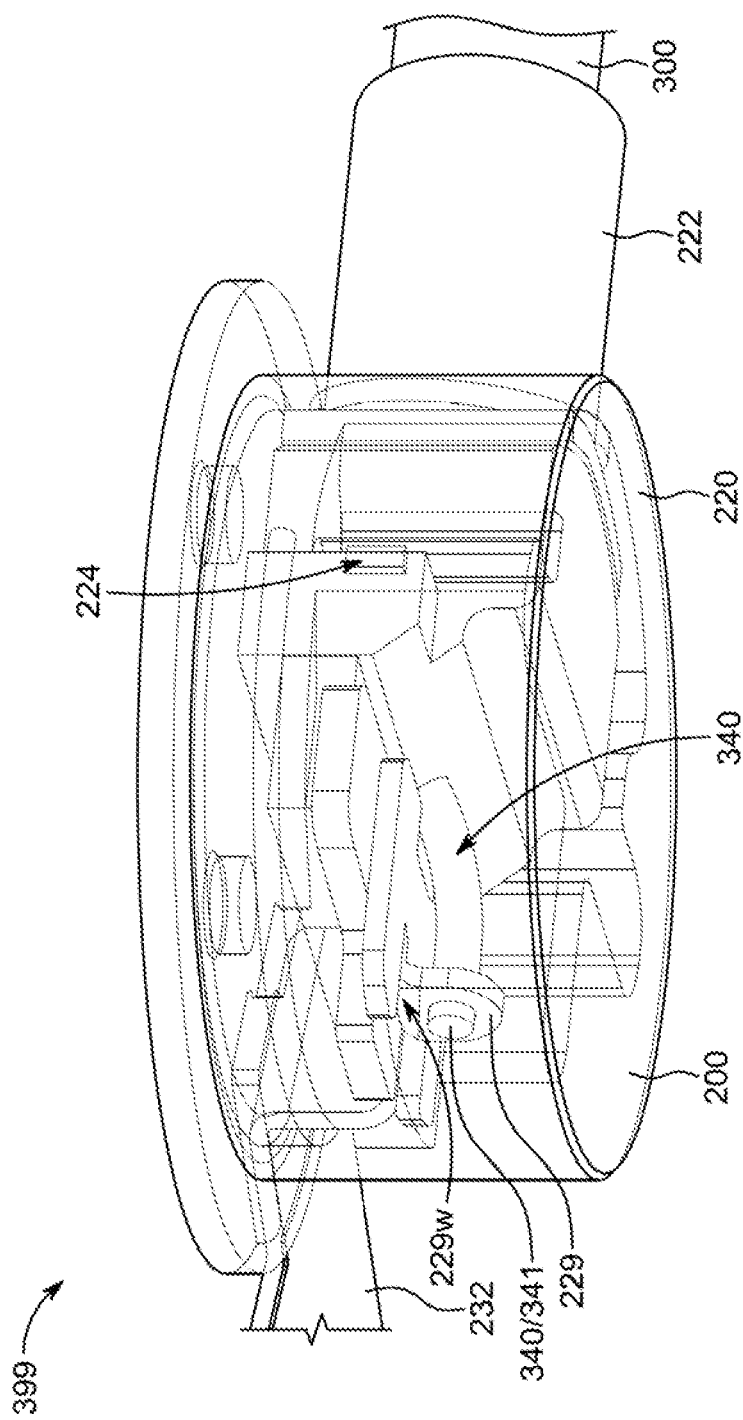
FIG. 22 is another perspective view of a portion of the device cable connector subassembly of FIG. 21 with a cap component partially transparent.

As shown in FIGS. 21, 22, 24, and 25, for example, device cable connector subassembly 200 may include one or more components that may be similar to one or more components of module cable connector subassembly 400. For example, as shown, device cable connector subassembly 200 may include a cap 220, while a strain relief component 222 and a portion of cable subassembly 300 therethrough may extend outwardly from cap 220 at any suitable orientation. A top cable crimp 224 (e.g., a stainless steel crimp) may be provided within cap 220 and may be operative to crimp about cable subassembly 300 adjacent strain relief component 222. In some embodiments, top cable crimp 224 may be provided at least partially within a wire comb that may arrange one, some, or each device conductor end 321 of respective conductor(s) 320 of cable subassembly 300 for coupling (e.g., electrical coupling (e.g., soldering)) to a respective electrical contact of a cap end 231 of a flex cable 232 that may be at least partially provided within cap 220. A connector end 233 of flex cable 232 may be provided in a device connector component 240 that may provide each respective electrical contact of flex cable 232 as a device cable connector contact 210 for interfacing with a respective cable device connector contact 110 of device 100. Additionally, as shown, a device memory cable end 341 of memory cable component 340 of cable subassembly 300 may be terminated at a coupling with cap end 231 of flex cable 232 and/or with cap 220. For example, as shown in FIGS. 21 and 22, device memory cable end 341 of memory cable component 340 may be coupled (e.g., fixed (e.g., crimped)) to a memory cable termination component 229 that may be any suitable structure integrated with or coupled (e.g., fixed (e.g., through laser weldings 229w)) to cap 220.

Figure 23:
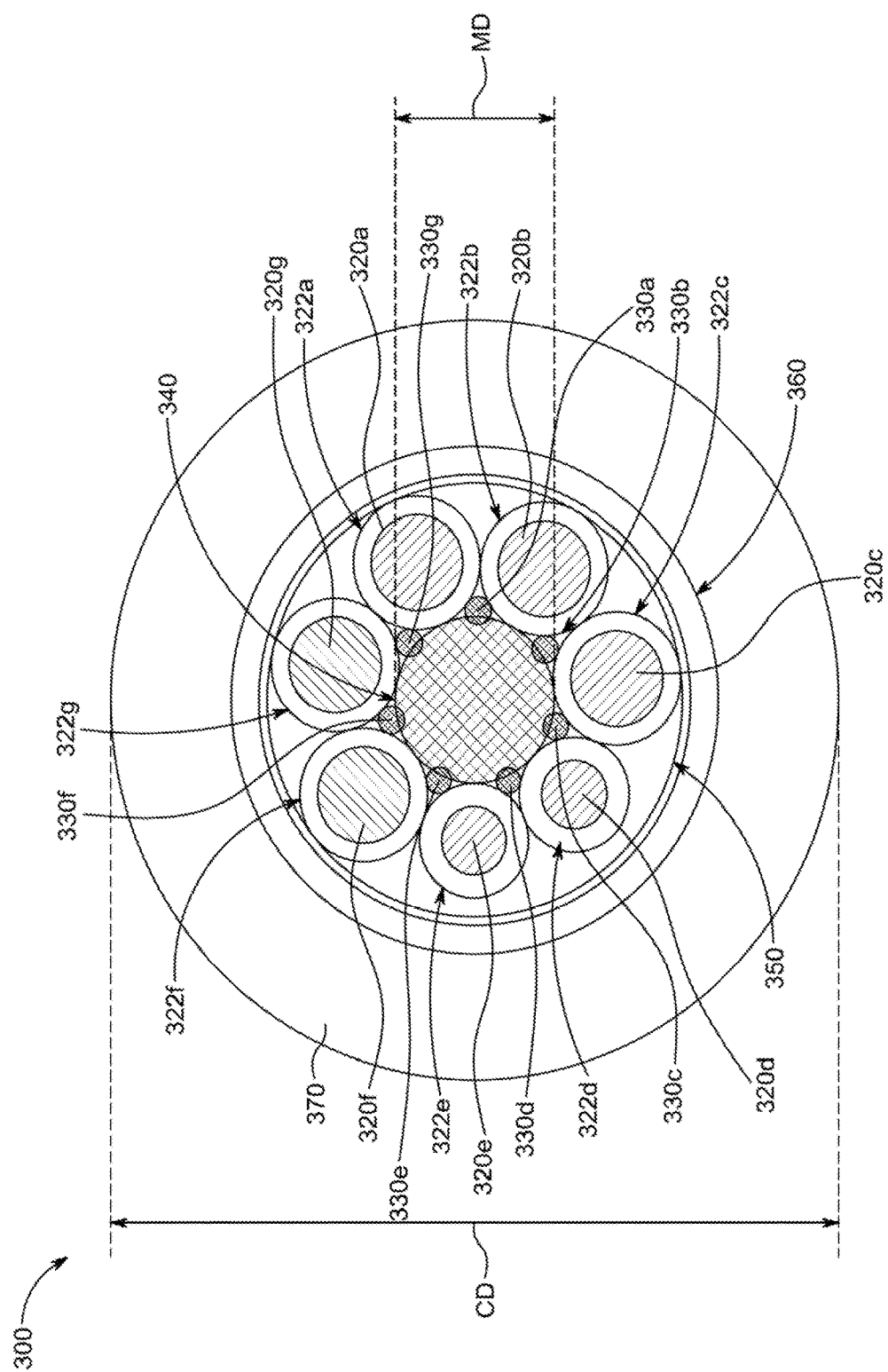
FIG. 23 is a cross-sectional view of a cable subassembly of the system of FIGS. 1-7, taken from line XXIII-XXIII of FIG. 2.

As shown in FIGS. 2 and 23, for example, cable subassembly 300 may include one or more cable conductors 320, each of which may extend between a device conductor end 321 and a module conductor end 329, a memory cable component 340 that may extend between a device memory cable end 341 and a module memory cable end 349, and an outer cable cover 370 that may be disposed about and along at least a portion of the collection of each conductor 320 and memory cable component 340. In the specific example shown in FIG. 23, cable subassembly 300 may include seven distinct cable conductor groups 320a-320g, each of which may include one or more electrically conductive wires, where each cable conductor group may be electrically isolated or insulated from each other (e.g., at least by respective insulation 322a-322g) and/or may be operative to conduct any suitable data signals and/or any suitable power signals between at least one contact of that cable conductor group at device conductor end 321 and at least one contact of that cable conductor group at module conductor end 329. In one specific example, each one of insulated conductor groups 320a, 320b, and 320c may be red and/or operative to provide a particular bus power ("$V_{BUS}$") line similar to that of a USB-C cable, insulated conductor group 320d may be white and/or operative to provide a position 1 positive ("Dp1") line of a SuperSpeed differential pair similar to that of a USB-C cable, insulated conductor group 320e may be green and/or operative to provide a position 1 negative ("Dn1") line of a SuperSpeed differential pair similar to that of a USB-C cable, insulated conductor group 320f may be operative to provide a ground return ("GND") line similar to that of a USB-C cable, and insulated conductor group 320g may be blue and/or operative to provide a particular bus power ("$V_{BUS}$") line and/or a particular configuration channel ("CC") line similar to that of a USB-C cable. Memory cable component 340 may be positioned to extend along a center longitudinal axis of cable subassembly 300, where insulated conductor groups 320 may be positioned about memory cable component 340. Memory cable component 340 may have any suitable cross-sectional dimension MD, such as in a range between 0.44 millimeters and 1.10 millimeters or a dimension of 0.75 millimeters. As also shown, one or more supports 330 (e.g., seven supports 330a-330g) may be positioned about memory cable component 340 (e.g., between memory cable component 340 and two adjacent insulated conductor groups) for providing support (e.g., as Kevlar supports) to cable subassembly 300. A tape 350 (e.g., an aluminum and/or Mylar tape) maybe be provided about the collection of insulated cable conductor groups 320a-320g, while a sheath 360 (e.g., a braided sheath) may be provided about tape 350, while cable cover 370 may be provided about sheath 360. Cover 370 may have any suitable cross-sectional dimension CD, such as in a range between 2.00 millimeters and 5.0 millimeters or a dimension of 3.41 millimeters.

Cable subassembly 300 may be assembled in any suitable fashion. For example, memory cable component 340 may be provided by any suitable process(es) using any suitable material(s), such as Nitinol or any other suitable material structure with a superelasticity that may be operative to be set to maintain or return to (e.g., absent certain external forces) any suitable pre-defined shape (e.g., a coil shape of FIGS. 24 and 25)). Once memory cable component 340 has been formed with such a shape, memory cable component 340 may be coextruded with one, some, or each of the other components of cable subassembly 300 to form cable subassembly 300 with that same shape as memory cable component 340. Alternatively, cable subassembly 300 may be initially assembled without memory cable component 340 but instead may be coextruded with a linear tube core component (not shown) filled with a rigid material (e.g., copper) in the place of memory cable component 340 (e.g., along a central longitudinal axis of cable subassembly 300). Then, the rigid material may be removed from cable subassembly 300 and memory cable component 340 may be fed into the space within cable subassembly 300 previously inhabited by the rigid core material to form cable subassembly 300 with that same shape as memory cable component 340. As mentioned, one or each end of memory cable component 340 may be terminated within a cable connector subassembly of cable assembly 399 (e.g., module memory cable end 349 of memory cable component 340 may be terminated at a coupling with intermediate o-ring cap 430 and/or top cap 420 and/or otherwise at module cable connector subassembly 400 and/or device memory cable end 341 of memory cable component 340 may be terminated at a coupling (e.g., a crimp) to memory cable termination component 229 with cap 220 and/or otherwise at device cable connector subassembly 200), which may prevent that memory cable component end from damaging one or more cable conductors 320 of cable subassembly 300 and/or one or more components of a connector subassembly and/or to restrict memory cable component 340 from moving to increase a spring constant of cable assembly 399 (e.g., to prevent memory cable component 340 from rotating). In some embodiments, cable subassembly 300 may be extruded and then immediately fed onto a large hub take-up reel (e.g., a reel with a diameter in a range between 0.20 meters and 0.40 meters or 0.32 meters (e.g., with a circumference of about 1.00 meters) that may be operative to hold 50-60 meters length of cable subassembly 300 in a single layer along and about the reel or that may be operative to hold 4 to 5 layers of such cable so as to hold 200-250 meters length of cable subassembly 300, where a continuous feed foam (e.g., foam gaskets) may be wrapped about the reel in between subsequent layers of cable subassembly 300 fed onto the reel). Then, cable subassembly 300 may be cut into section lengths appropriate for cable assembly 399 immediately after the cable has been extruded and fed onto the hub take-up reel (e.g., with a metal blade), which may avoid a compression set in cable cover 370 and/or minimize changes in cable subassembly diameter (e.g., cross-sectional dimension CD) due to use of the hub take-up reel.

Figure 24:
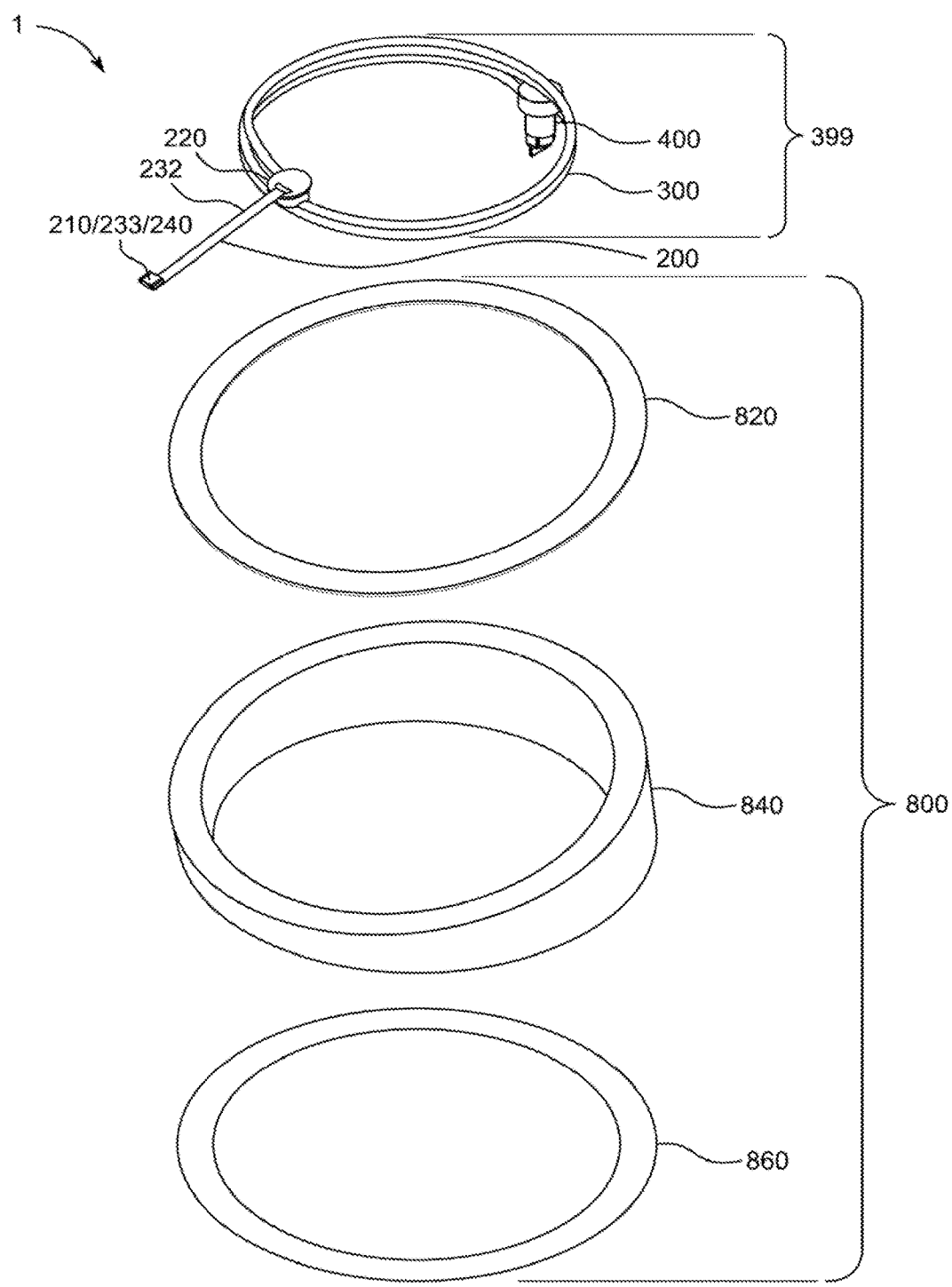
FIG. 24 is an exploded top perspective view of a stand assembly of the system of FIGS. 1-7.
Figure 25:
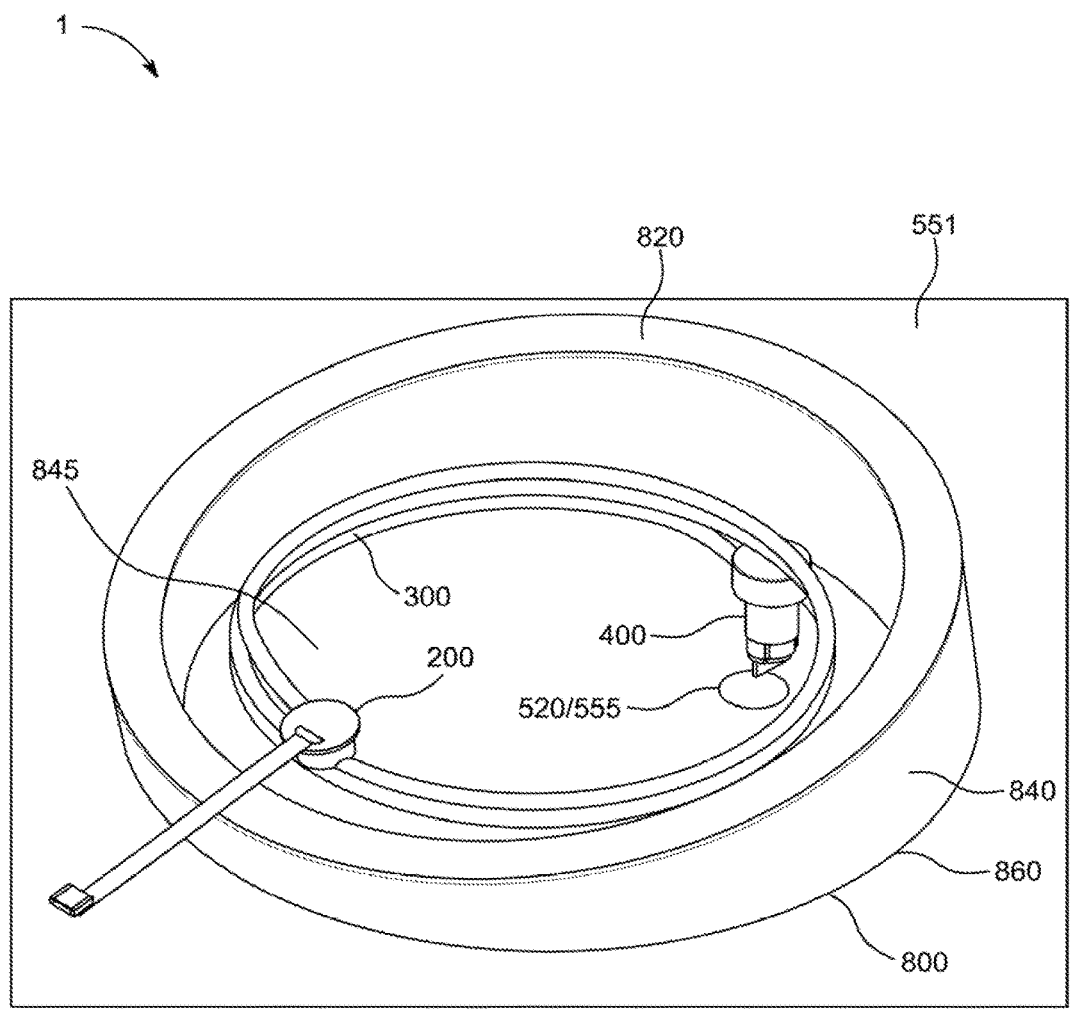
FIG. 25 is a top perspective view of the stand assembly of FIG. 25 when fully assembled and positioned on a table of the system of FIGS. 1-7.

As shown in FIGS. 24 and 25, for example, stand assembly 800 may include a top ring 820, a stand body 840 with an angled top body surface with respect to bottom body surface, and a base 860, where ring 820 may be provided on the top body surface of body 840 and operative to support a bottom surface of user device 100 (e.g., in a non-slip relationship) such that user device 100 may be rested on top of stand assembly 800, while the bottom body surface of body 840 may be provided on base 860, where base 860 may include an adhesive feature (e.g., a stretch release adhesive) that may be operative to be removably adhered to stand body 840 and to top table surface 551 of table 550. Therefore, user device 100 may be presented by stand assembly 800 at an angle above top table surface 551. Cable subassembly 300 may be positioned within a hollow space 845 defined by stand body 840 (e.g., above top table surface 551) and table opening 555 may be exposed through a portion of table 550 above which hollow space 845 of stand body 840 may be positioned, such that even top cap 420 of module cable connector subassembly 400 may be hidden from view of a user of user device 100 when user device 100 is resting on top ring 820 and covering hollow space 845 of stand assembly 800. The coiled shape of memory cable component 340 of cable subassembly 300 may be operative to provide a coiled shape of cable subassembly 300 that may easily fit within hollow space 845 of stand assembly 800. Therefore, cable assembly 399 may include a memory cable component 340 with a pre-defined memory shape of a coil with a coil diameter that may be large enough such that the coiled length of cable subassembly 300 between connector subassemblies 200 and 400 may lay relatively flat (e.g., coils stacked in a short stack) or not too high up from top table surface 551, which may enable stand assembly 800 to be low profile (e.g., with a minimized height up from top table surface 551) for supporting device 100 while still providing enough cable subassembly length to enable a user to lift up and manipulate device 100.

Figure 26:
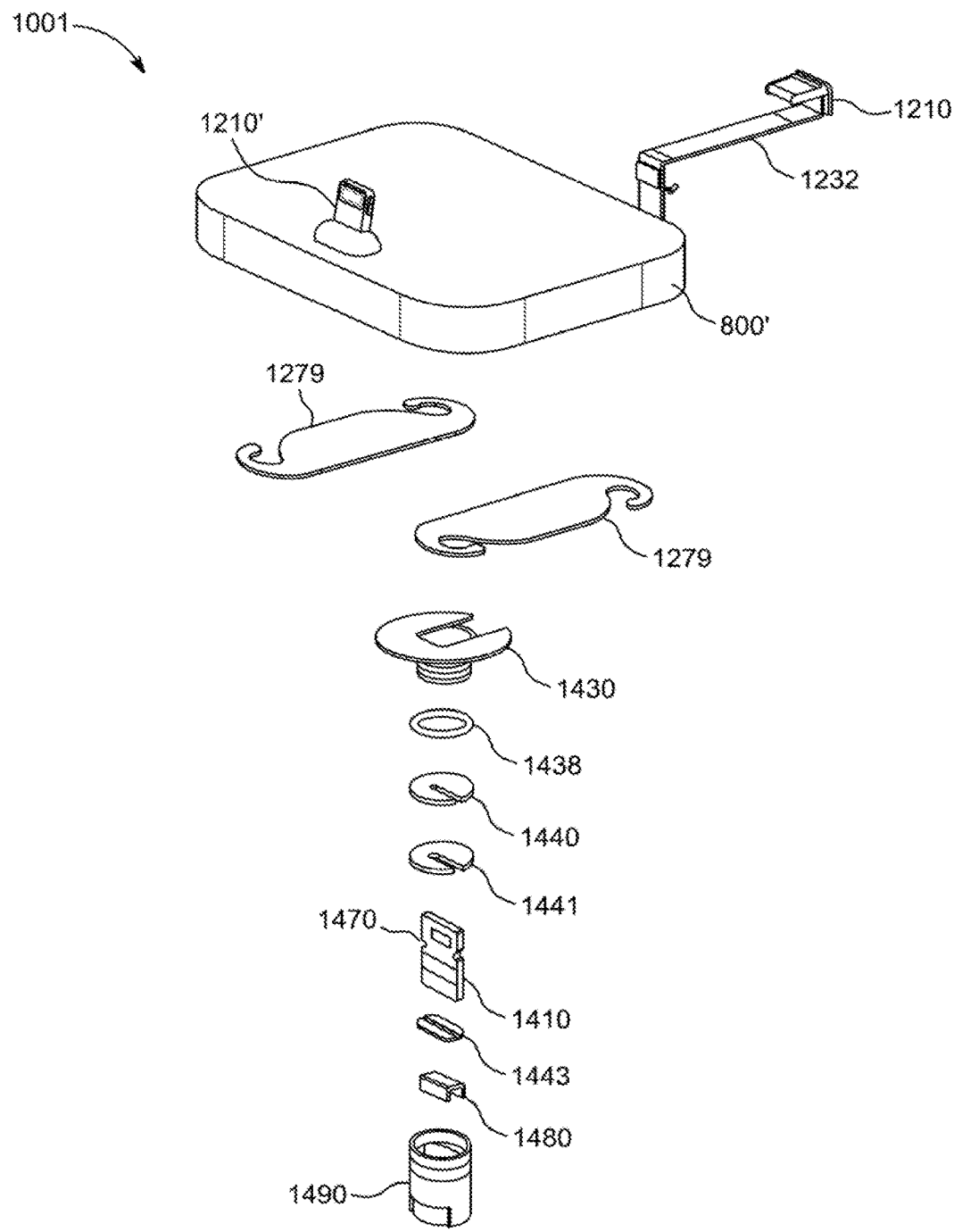
FIG. 26 is an exploded top perspective view of a portion of another illustrative system.
Figure 27:
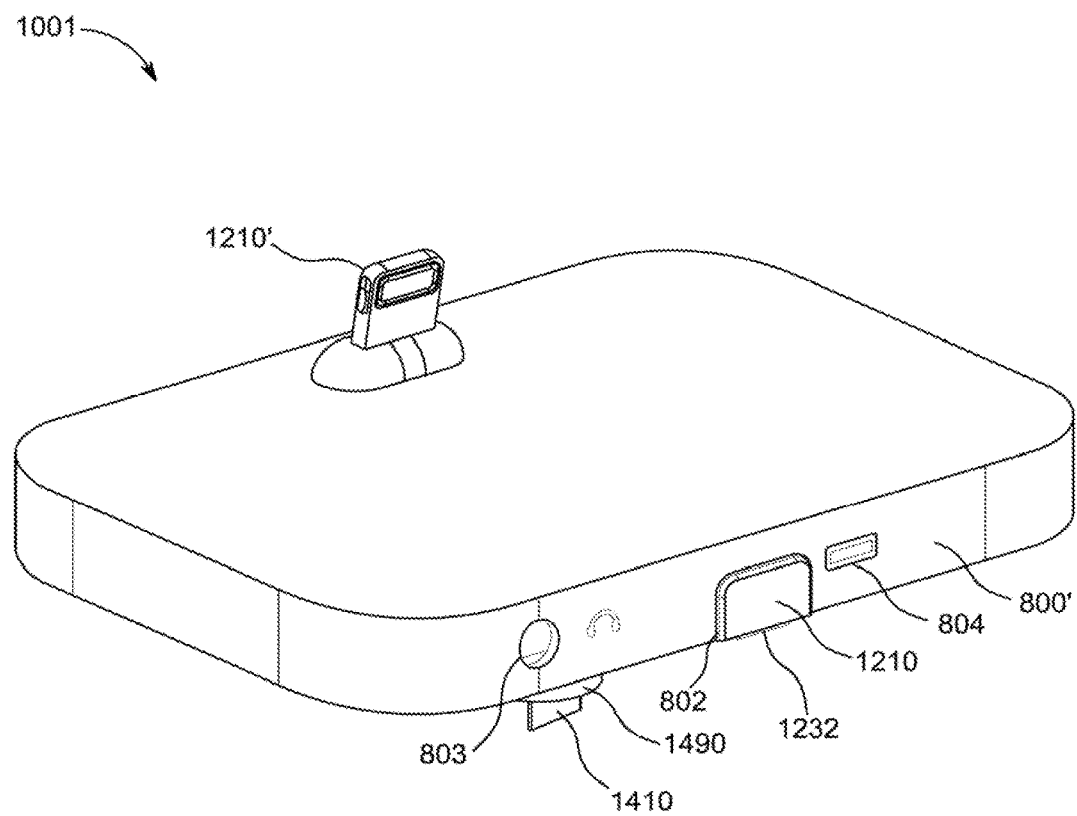
FIG. 27 is another top perspective view of the portion of the system of FIG. 26 when fully assembled.

At least a portion of an alternative system 1001 is shown in FIGS. 26 and 27 with a stand assembly 800' on which a user device (e.g., user device 100) may be perched when not being held by a user (e.g., for presentation in a retail environment). Stand assembly 800' may include at least one device cable connector contact 1210' (e.g., one or more contacts of a Lightning™ connector by Apple Inc. or any other suitable connector, which may be male or female) that may be operative to be electrically coupled with at least one contact of a cable device connector (e.g., cable device connector 102 of user device 100 (e.g., a Lightning™ connector by Apple Inc. or any other suitable connector, which may be male or female)). A user device may be electrically coupled to device cable connector contact 1210' and/or may be physically supported by stand assembly 800', where a bottom surface of stand assembly 800' may be operative to rest on top table surface 551 of table 550. One or more coupling mechanisms 1279 (e.g., stretch release adhesive) may be used to couple a bottom surface of stand assembly 800' to top table surface 551 of table 550 (e.g., such that at least a portion of stand assembly 800' may be held at least partially over table opening 555). A device cable connector contact 1210 may be electrically coupled to device cable connector contact 1210' (e.g., via any suitable conductor assembly within or along stand assembly 800' (e.g., via a port 802 on a rear wall of stand assembly 800' (e.g., port 802 may receive any suitable device cable connector contact 1210 (e.g., each may be respective Lightning connector components)))). As shown, stand assembly 800' may include any other suitable port, such as an audio component port 803 and/or any suitable data port 804.

A flex cable 1232 may electrically couple (e.g., via hot bar) device cable connector contact 1210 (e.g., as may be electrically coupled to device cable connector contact 1210') to at least one module cable connector contact 1410 of a plug board 1470 (e.g., flex cable 1232 may extend along a portion of a bottom surface of stand assembly 800' and an exposed copper pad of flex cable 1232 may be electrically coupled to a particular contact 1410 of plug board 1470). An upper portion of an intermediate o-ring cap 1430 may be coupled to (e.g., adhered to) a bottom surface of stand assembly 800' and may be operative to enable a portion of flex cable 1232 to extend therethrough for coupling to plug board 1470. An intermediate o-ring 1438 (e.g., a rubber o-ring) may be positioned about a lower portion of intermediate o-ring cap 1430 and may be operative to facilitate robust retention of o-ring cap 1430 (e.g., of a module cable connector subassembly of system 1001) within trim space 525 of trim component 520 of platform assembly 500 (e.g., to prevent any pulling out of the module cable connector subassembly from platform assembly 500, which may trip a security alarm of system 1001) and/or to prevent any fluid ingress downward from top table surface 551 into the module cable connector subassembly when positioned within table opening 555 and platform assembly 500. In some embodiments, rather than provided by an o-ring (e.g., a silicone o-ring), ring 1438 may be provided by a c-ring (e.g., a stainless-steel c-ring spring that is not continuous but discontinuous), which may be operative to provide an audible and/or tactile click when cap 1430 is inserted for retention within trim space 525. Such a module cable connector subassembly of system 1001 may also include a rear or top electromagnetic interference ("EMI") gasket 1440 and a top EMI washer 1441 that may abut a bottom surface of intermediate o-ring cap 1430, such as to act as a rear or top EMI shield with top EMI gasket 1440 thereabout. A front or bottom EMI gasket 1480 and/or a bottom or pressure EMI washer 1443 may surround a portion of plug board 1470. Additionally, a module cable connector subassembly of system 1001 may include a plug boot 1490 (e.g., a stainless steel structure) that may be operative to provide an EMI shield and enclosure to at least a portion of flex cable 1232 and/or plug board 1470. For example, plug boot 1490 may be shaped to receive a portion of flex cable 1232 and/or plug board 1470, such as by a hollow cylindrical shape extending from a top plug boot surface to a bottom plug boot surface and defining a plug boot space that may be operative to house at least a bottom portion of intermediate o-ring cap 1430 and/or top EMI gasket 1440 and/or at least a top portion of plug board 1470. Bottom EMI gasket 1480 may also be positioned at least partially within the plug boot space of plug boot 1490 or may be positioned outside of the plug boot space of plug boot 1490 but with a top surface of gasket 1480 against or proximately adjacent to the bottom plug boot surface of plug boot 1490, such that top EMI gasket 1440, plug boot 1490, and bottom EMI gasket 1480 may together be operative to provide an EMI cage and enclosure for protecting portions of flex cable 1232 and/or plug board 1470 from electromagnetic interference (e.g., a top plug boot portion of plug boot 1490 may be coupled to o-ring cap 1430). Each one of gaskets 1440 and 1480 may be any suitable material. For example, top EMI gasket 1440 may be a foam gasket or a gasket made of fabric over foam, while bottom EMI gasket 1480 may be a compressible silicon gasket that may be impregnated with one or more metal pieces (e.g., a metal band within gasket 1480) or shore 50 STEM and/or foam and/or fabric over foam.

As shown in FIG. 27, for example, a bottom portion of at least one module cable connector contact 1410 of plug board 1470 may be exposed similarly to at least one contact 410 of plug board 470 for electrically coupling to cable module connector subassembly 700, while another portion of the at least one module cable connector contact 1410 of plug board 1470 may be electrically coupled (e.g., within the EMI cage) to flex cable 1232, which may in turn be electrically coupled to at least one contact of device cable connector contact 1210, which may in turn be electrically coupled to at least one contact of device cable connector contact 1210' of stand assembly 800' of system 1001, which may in turn be electrically coupled to at least one contact of cable device connector 102 of user device 100 when device 100 is supported by stand assembly 800' (e.g., both power and data may be electrically communicated between device 100 and cable module connector subassembly 700 along one or two or more such paths of system 1001 when device 100 is electrically coupled to stand assembly 800', which may be positioned on table 550 for covering at least a portion or the entirety of opening 555).

Figure 28:
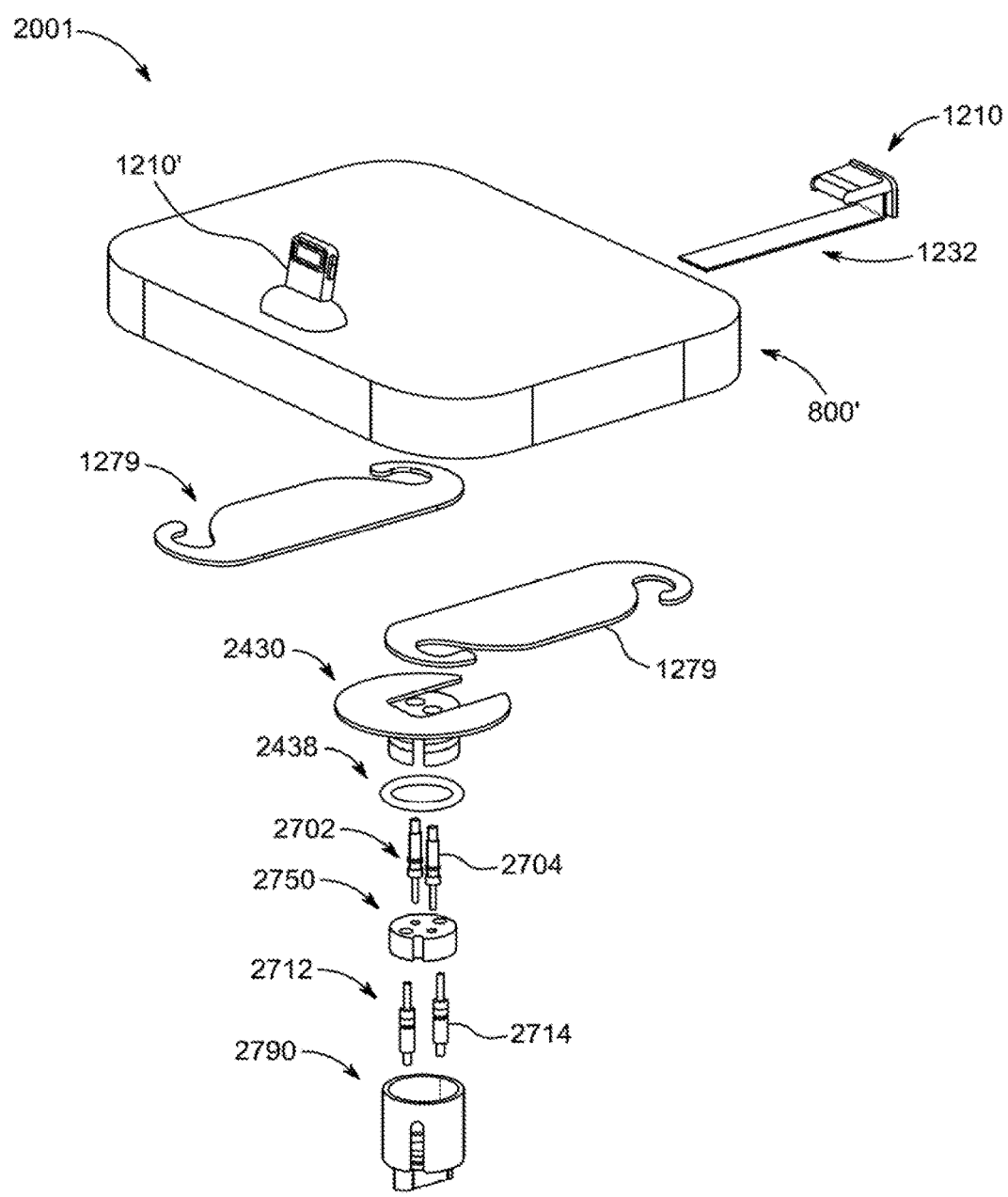
FIG. 28 is an exploded top perspective view of a portion of yet another illustrative system.
Figure 29:
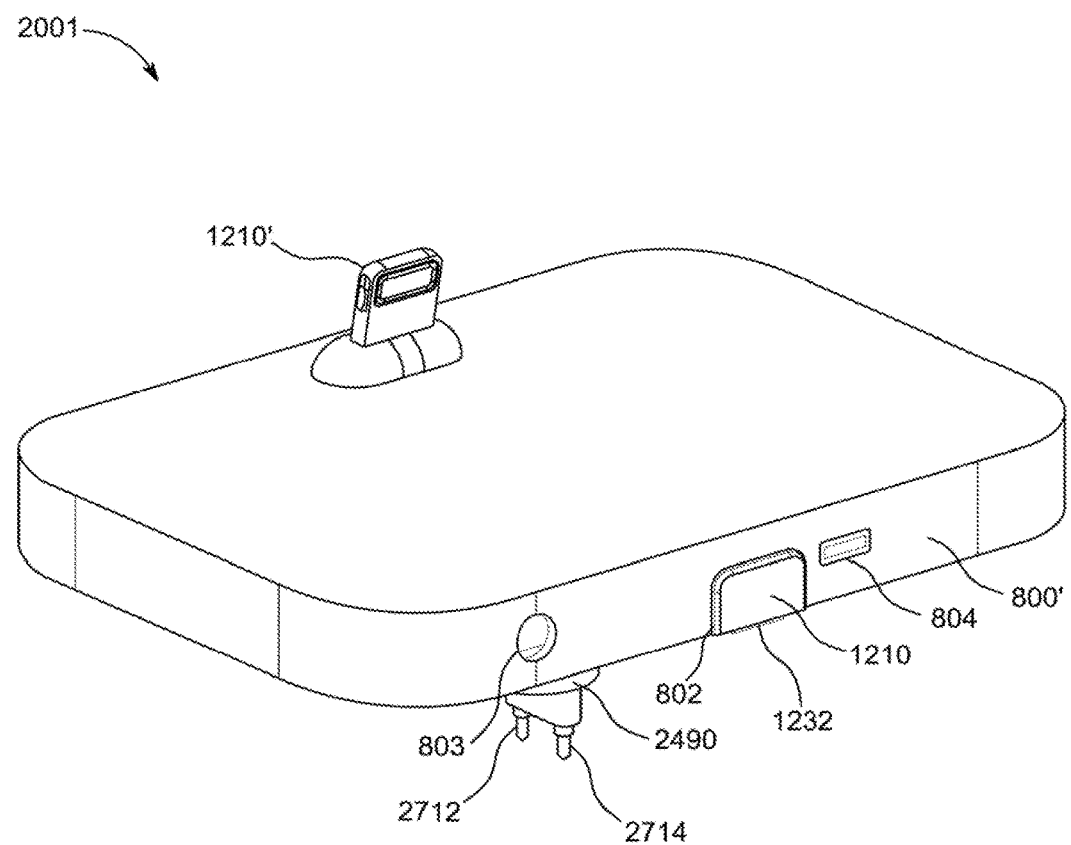
FIG. 29 is another top perspective view of the portion of the system of FIG. 28 when fully assembled.

At least a portion of yet another alternative system 2001 is shown in FIGS. 28 and 29 with a stand assembly 800' on which a user device (e.g., user device 100) may be perched when not being held by a user (e.g., for presentation in a retail environment). Stand assembly 800' may include device cable connector contact 1210' (e.g., a Lightning™ connector by Apple Inc. or any other suitable connector, which may be male or female) that may be operative to be electrically coupled with at least one contact of a cable device connector (e.g., cable device connector 102 of user device 100 (e.g., a Lightning™ connector by Apple Inc. or any other suitable connector, which may be male or female)). A user device may be electrically coupled to device cable connector contact 1210' and/or may be physically supported by stand assembly 800', where a bottom surface of stand assembly 800' may be operative to rest on top table surface 551 of table 550. One or more coupling mechanisms 1279 (e.g., stretch release adhesive) may be used to couple a bottom surface of stand assembly 800' to top table surface 551 of table 550 (e.g., such that at least a portion of stand assembly 800' may be held at least partially over table opening 555). Device cable connector contact 1210 may be electrically coupled to device cable connector contact 1210' (e.g., via any suitable conductor assembly within or along stand assembly 800' (e.g., via port 802 on a rear wall of stand assembly 800' (e.g., port 802 may receive any suitable device cable connector contact 1210 (e.g., each may be respective Lightning connector components)))). As shown, stand assembly 800' may include any other suitable port, such as audio component port 803 and/or any suitable data port 804.

Flex cable 1232 may electrically couple (e.g., via hot bar) device cable connector contact 1210 (e.g., as may be electrically coupled to device cable connector contact 1210') to at least one of pogo pin contacts 2702 and 2704, each of which may be electrically coupled to a respective one of pogo pin contacts 2712 and 2714 via a pass through PCB board 2750 (e.g., flex cable 1232 may extend along a portion of a bottom surface of stand assembly 800' and an exposed copper pad of flex cable 1232 may be electrically coupled to a particular one of pogo pin contacts 2702 and 2704). An upper portion of an intermediate o-ring cap 2430 may be coupled to (e.g., adhered to) a bottom surface of stand assembly 800' and may be operative to enable a portion of flex cable 1232 to extend therethrough for coupling to at least one of pogo pin contacts 2702 and 2704. An intermediate o-ring 2438 (e.g., a rubber o-ring) may be positioned about a lower portion of intermediate o-ring cap 2430 and may be operative to facilitate robust retention of o-ring cap 2430 (e.g., of a module cable connector subassembly of system 2001) within trim space 525 of trim component 520 of platform assembly 500 (e.g., to prevent any pulling out of the module cable connector subassembly from platform assembly 500, which may trip a security alarm of system 2001) and/or to prevent any fluid ingress downward from top table surface 551 into the module cable connector subassembly when positioned within table opening 555 and platform assembly 500. In some embodiments, rather than provided by an o-ring (e.g., a silicone o-ring), ring 2438 may be provided by a c-ring (e.g., a stainless-steel c-ring spring that is not continuous but discontinuous), which may be operative to provide an audible and/or tactile click when cap 2430 is inserted for retention within trim space 525. Such a module cable connector subassembly of system 2001 may also include a plug boot 2490 (e.g., a stainless steel structure) that may be operative to provide an EMI shield and enclosure to at least a portion of flex cable 1232 and/or to at least one of pogo pin contacts 2702 and 2704 and/or to at least one of pogo pin contacts 2712 and 2714 and/or to PCB board 2750. For example, plug boot 2490 may be shaped to receive a portion of flex cable 1232 and/or at least one of pogo pin contacts 2702 and 2704 and/or at least one of pogo pin contacts 2712 and 2714 and/or PCB board 2750, such as by a hollow cylindrical shape extending from a top plug boot surface to a bottom plug boot surface and defining a plug boot space that may be operative to house at least a bottom portion of intermediate o-ring cap 2430. Plug boot 2490 and o-ring cap 2430 may together be operative to provide an EMI cage and enclosure for protecting portions of flex cable 1232 and/or at least one of pogo pin contacts 2702 and 2704 and/or at least one of pogo pin contacts 2712 and 2714 and/or PCB board 2750 from electromagnetic interference (e.g., a top plug boot portion of plug boot 2490 may be coupled to o-ring cap 2430).

As shown in FIG. 29, for example, a bottom portion of at least one of pogo pin contacts 2712 and 2714 may be exposed similarly to at least one contact 410 of plug board 470 for electrically coupling to cable module connector subassembly 700, while another portion of a respective at least one of pogo pin contacts 2702 and 2704 may be electrically coupled (e.g., within the EMI cage) to flex cable 1232, which may in turn be electrically coupled to at least one contact of device cable connector contact 1210, which may in turn be electrically coupled to at least one contact of device cable connector contact 1210' of stand assembly 800', which may in turn be electrically coupled to at least one contact of cable device connector 102 of user device 100 when device 100 is supported by stand assembly 800' of system 2001 (e.g., both power and data may be electrically communicated between device 100 and cable module connector subassembly 700 along one or two (e.g., the two sets of pogo pins coupled via PCB board 2750) or more such paths of system 2001 when device 100 is electrically coupled to stand assembly 800', which may be positioned on table 550 for covering at least a portion or the entirety of opening 555).

Figure 30:
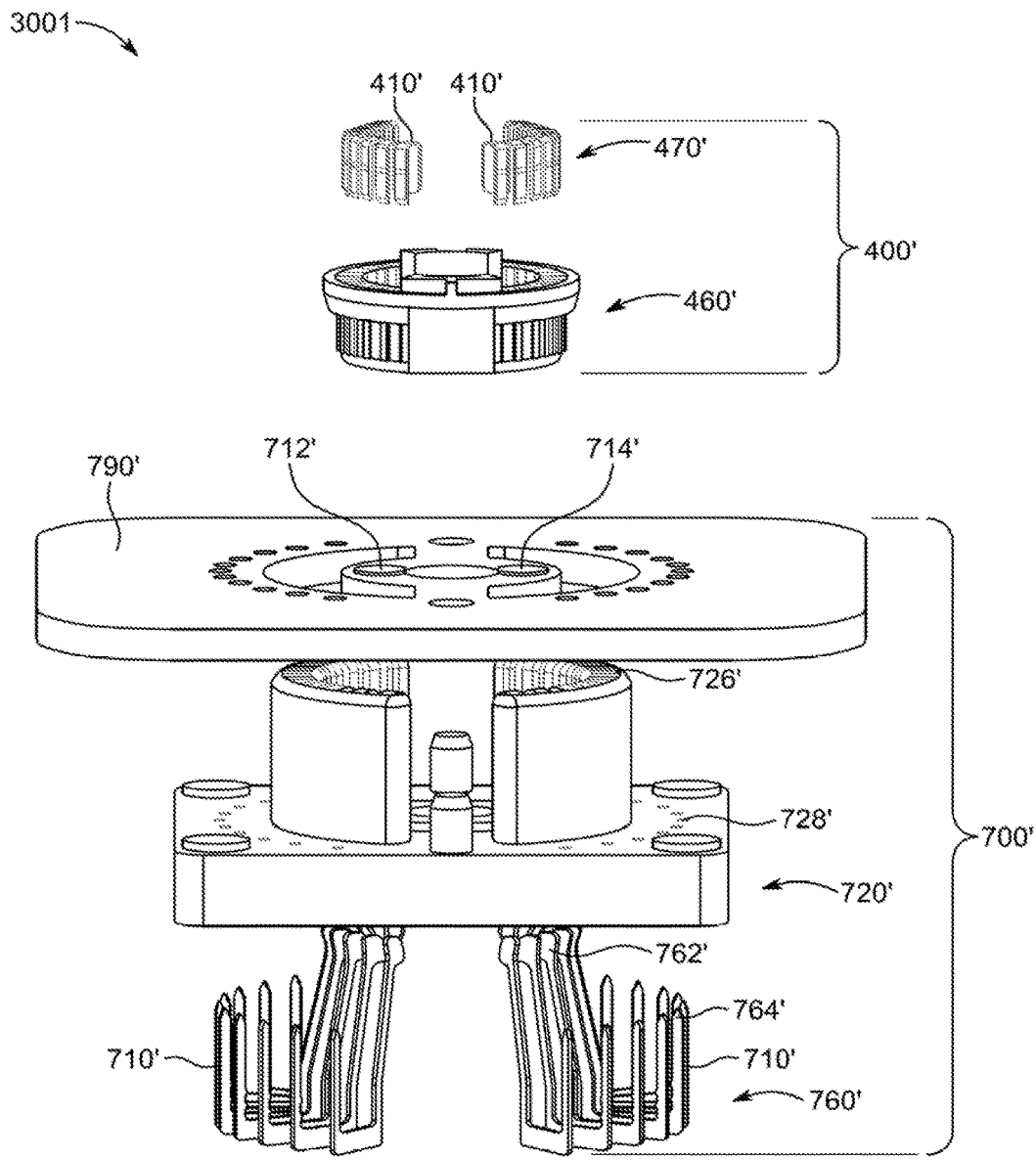
FIG. 30 is an exploded top perspective view of a portion of another system with another cable module connector and another module cable connector subassembly.
Figure 31:
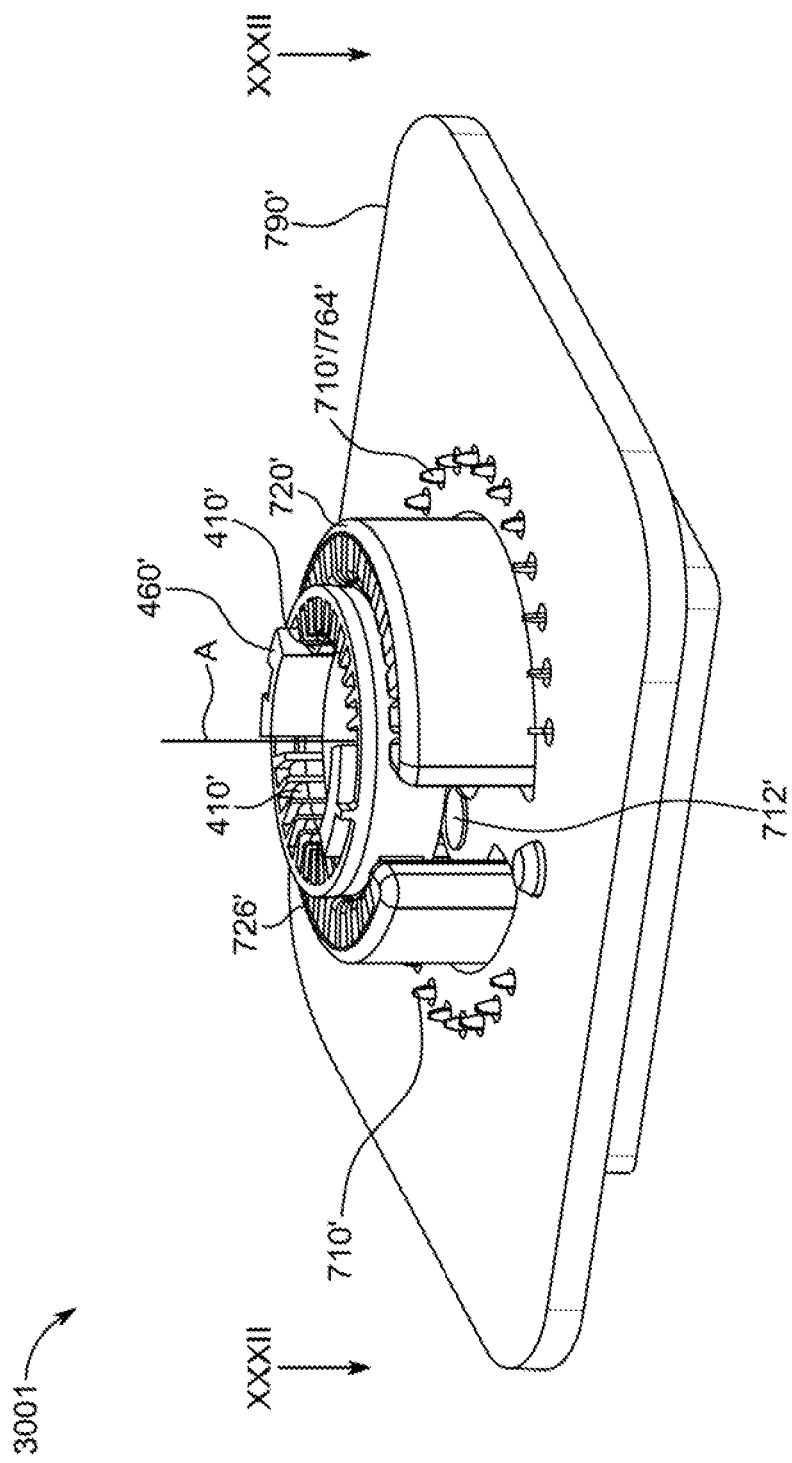
FIG. 31 is a top perspective view of the portion of the system of FIG. 30 when fully assembled.

As shown in FIGS. 30-32, for example, an alternative system 3001 may include an alternative module cable connector subassembly 400' and an alternative cable module connector subassembly 700'. Module cable connector subassembly 400' may include a mold 460' (e.g., a molded structure of polypropylene ("PP") and/or of polyethylene ("PE")) that may guide a module conductor end 329 of each cable conductor 320 of cable subassembly 300 to an electrical coupling at a respective module cable connector contact 410' of a radial pin wheel plug 470', where mold 460' (e.g., a molded structure of polypropylene ("PP") and/or of polyethylene ("PE")) may be provided to protect at least partially one or each electrical connection. Module cable connector subassembly 400' may include any other suitable components, which may be similar to any similar components of module cable connector subassembly 400. Cable module connector subassembly 700' may include one or more pogo pin contacts, such as pogo pin contacts 712' and 714' (e.g., copper alloy contacts with gold plating), a cable module connector housing 720' (e.g., a nylon structure with a percentage of (e.g., 30%) glass fiber), a contact structure 760' (e.g., a copper alloy structure with gold plating) that may provide one, some, or each cable module connector contact 710' (e.g., twenty-two contacts 710'), and/or a printed circuit board ("PCB") 790' (e.g., a PCB of MLB 660 of assembly 600). A first portion of contact structure 760' (e.g., a first inner portion 762' of one, some, or each contact 710') may be positioned within an inner contact structure receptacle 726' of housing 720', while a second portion of contact structure 760' (e.g., a second outer portion 764' of one, some, or each contact 710') may be positioned within and/or through an outer contact structure receptacle 728' of housing 720' (e.g., for coupling to any suitable trace(s) or contact(s) of PCB 790' (not shown)).

Cable module connector subassembly 700' may be assembled in any suitable fashion. For example, in some embodiments, housing 720' may be inserted up through one or more passageways through PCB 790', where a top portion of housing 720' may extend upward out and away from a top surface of PCB 790' (e.g., to interact with mold 460' and/or one or more module cable connector contacts 410' of radial pin wheel plug 470'). Contact structure 760' may be pressed into or otherwise fitted with housing 720', such as inserted up and through receptacles 726' and/or 728', prior to, during, or after housing 720' may be positioned through PCB 790', where an inner portion of inner contact structure receptacle 726' of housing 720' and/or any portion of a first inner portion 762' of one, some, or each contact 710' positioned therein may be accessed via a top surface of housing 720' (e.g., accessed at an appropriate time by plug board 470' such that contact(s) 410' of radial pin wheel plug 470' may interface (e.g., electrically couple) with contact(s) 710' of contact structure 760'). Electrical contacts of contact structure 760' (e.g., one, some, or each second outer portion 764') may be electrically coupled (e.g., via surface-mount technology ("SMT")) to respective portions of PCB 790' and/or passed through respective openings in PCB 790'.

Unlike module cable connector subassembly 400, which may be similar to a USB-C cable connector, module cable connector subassembly 400' may be provided with a radial pin wheel geometry for plug 470' with contacts 410'. Similarly, unlike cable module connector subassembly 700, which may be similar to a USB-C cable connector, cable module connector subassembly 700' may be provided with a radial pin wheel geometry for contact structure 760' with first inner portion 762' of one, some, or each contact 710' provided in a radial configuration. Such a radial structure for contacts 410' and 710' may be operative to provide rotational tolerance between plug 470' and contact structure 760' (e.g., about axis A), such that system 3001 may be tolerant to rotational misalignment between plug 470' and contact structure 760'.

While there have been described systems for presenting electrically supported devices, it is to be understood that many changes may be made therein without departing from the spirit and scope of the disclosure. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention(s) can be practiced by other than the described embodiments, which are presented for purposes of illustration rather than of limitation.

What is claimed is:

1. A cable assembly for electrically coupling with a cable module connector subassembly of a support module assembly comprising a support mating feature, wherein the cable module connector subassembly comprises a cable module connector contact, the cable assembly comprising:
    a cable subassembly comprising an electrical conductor extending between a first conductor end and a second conductor end; and
    a module cable connector subassembly comprising:
        a boot structure comprising an interior boot surface and an exterior boot surface extending from a first boot open end to a second boot open end, wherein the interior boot surface defines a boot space;
        a module cable connector contact that is electrically coupled to the second conductor end at an electrical coupling location within the boot space;
        a cap; and
        a ring, wherein:
            the ring is positioned about a portion of the cap;
            the exterior boot surface comprises a boot mating feature operative to mate with the support mating feature; and
            the module cable connector subassembly is operative to interface with the support module assembly for electrically coupling the module cable connector contact to the cable module connector contact when the boot mating feature is mated with the support mating feature.

2. The cable assembly of claim 1, wherein:
    the module cable connector subassembly is operative to interface with the support module assembly for electrically coupling the module cable connector contact to the cable module connector contact when the module cable connector contact is moved along a linear axis towards the cable module connector contact; and
    when the boot mating feature is mated with the support mating feature, the module cable connector contact is properly oriented along the linear axis with respect to the cable module connector contact for electrically coupling the module cable connector contact to the cable module connector contact.

3. The cable assembly of claim 1, wherein:
    the module cable connector subassembly is operative to interface with the support module assembly for electrically coupling the module cable connector contact to the cable module connector contact when the module cable connector contact is moved along a linear axis towards the cable module connector contact; and
    when the boot mating feature is mated with the support mating feature, the module cable connector contact is properly oriented about the linear axis with respect to the cable module connector contact for electrically coupling the module cable connector contact to the cable module connector contact.

4. The cable assembly of claim 1, wherein the module cable connector subassembly provides a superset of a universal serial bus ("USB") Type-C connector.

5. The cable assembly of claim 4, wherein the module cable connector contact provides a male-type connector contact.

6. The cable assembly of claim 1, wherein the module cable connector contact provides a male-type connector contact.

7. A cable assembly for electrically coupling with a cable module connector subassembly of a support module assembly comprising a support mating feature, wherein the cable module connector subassembly comprises a cable module connector contact, the cable assembly comprising:
    a cable subassembly comprising an electrical conductor extending between a first conductor end and a second conductor end; and
    a module cable connector subassembly comprising:
        a boot structure comprising an interior boot surface and an exterior boot surface extending from a first boot open end to a second boot open end, wherein the interior boot surface defines a boot space; and
        a module cable connector contact that is electrically coupled to the second conductor end at an electrical coupling location within the boot space, wherein:
            the exterior boot surface comprises a boot mating feature operative to mate with the support mating feature;

the module cable connector subassembly is operative to interface with the support module assembly for electrically coupling the module cable connector contact to the cable module connector contact when the boot mating feature is mated with the support mating feature;

the cable subassembly further comprises a memory cable component extending between a first memory cable end and a second memory cable end;

at least a portion of the memory cable component is configured to define a curved shape between the first memory cable end and the second memory cable end absent any external force applied to the cable assembly;

the module cable connector subassembly further comprises a cap that is at least partially positioned within the boot space;

the electrical conductor passes through the cap; and the second memory cable end is fixed to the cap.

8. The cable assembly of claim 1, wherein:

another portion of the cap is positioned within the boot space; and the ring enables robust retention of the module cable connector subassembly within a portion of the support module assembly when the module cable connector contact is electrically coupled to the cable module connector contact.

9. The cable assembly of claim 1, wherein:

another portion of the cap is positioned within the boot space; and the ring prevents fluid ingress into a portion of the support module assembly when the module cable connector contact is electrically coupled to the cable module connector contact.

10. A cable assembly for electrically coupling with a cable module connector subassembly of a support module assembly comprising a support mating feature, wherein the cable module connector subassembly comprises a cable module connector contact, the cable assembly comprising:

a cable subassembly comprising an electrical conductor extending between a first conductor end and a second conductor end; and a module cable connector subassembly comprising:

a boot structure comprising an interior boot surface and an exterior boot surface extending from a first boot open end to a second boot open end, wherein the interior boot surface defines a boot space; and a module cable connector contact that is electrically coupled to the second conductor end at an electrical coupling location within the boot space, wherein:

the exterior boot surface comprises a boot mating feature operative to mate with the support mating feature;

the module cable connector subassembly is operative to interface with the support module assembly for electrically coupling the module cable connector contact to the cable module connector contact when the boot mating feature is mated with the support mating feature;

the support module assembly comprises the cable module connector contact positioned below a top surface of a support structure;

the module cable connector subassembly further comprises a cap;

the electrical conductor passes through the cap; and the cap is positioned above the top surface of the support structure when the module cable connector contact is electrically coupled to the cable module connector contact.

11. A cable assembly for electrically coupling with a cable module connector subassembly of a support module assembly comprising a support mating feature, wherein the cable module connector subassembly comprises a cable module connector contact, the cable assembly comprising:

a cable subassembly comprising an electrical conductor extending between a first conductor end and a second conductor end; and a module cable connector subassembly comprising:

a boot structure comprising an interior boot surface and an exterior boot surface extending from a first boot open end to a second boot open end, wherein the interior boot surface defines a boot space; and a module cable connector contact that is electrically coupled to the second conductor end at an electrical coupling location within the boot space, wherein:

the exterior boot surface comprises a boot mating feature operative to mate with the support mating feature;

the module cable connector subassembly is operative to interface with the support module assembly for electrically coupling the module cable connector contact to the cable module connector contact when the boot mating feature is mated with the support mating feature;

the module cable connector subassembly further comprises a gasket positioned at least partially about the module cable connector contact and across the second boot open end;

the gasket and the boot structure together provide at least a portion of an electromagnetic interference cage for protecting the electrical coupling location from electromagnetic interference; and the gasket is operative to interact with a portion of the cable module connector subassembly to provide at least a portion of an electromagnetic interference shield for shielding an electrical signal communication coupling between the module cable connector subassembly and the cable module connector subassembly when the module cable connector contact is electrically coupled to the cable module connector contact.

12. A support module assembly for electrically coupling with a module cable connector subassembly, wherein the module cable connector subassembly comprises a module cable connector contact, the support module assembly comprising:

a support structure comprising a support structure opening extending between a top surface of the support structure and a bottom surface of the support structure;

a trim component comprising an interior trim surface and an exterior trim surface extending from a first trim open end to a second trim open end; and a cable module connector subassembly comprising:

a cable module connector housing; and a cable module connector contact positioned at least partially within the cable module connector housing, wherein:

the interior trim surface defines a trim space operative to receive a portion of the module cable connector subassembly;

a first portion of the trim space is positioned within the structure opening;

at least a portion of the cable module connector housing is positioned within a second portion of the trim space; and the cable module connector contact is operative to be electrically coupled to the module cable connector contact when the trim space receives the portion of the module cable connector subassembly.

13. The support module assembly of claim 12, wherein:

an electrical coupling location of the cable module connector contact is operative to be electrically coupled to the module cable connector contact when the trim space receives the portion of the module cable connector subassembly; and the electrical coupling location of the cable module connector contact is positioned outside of the support structure opening and below the bottom surface of the support structure.

14. The support module assembly of claim 13, wherein the cable module connector contact is operative to be electrically coupled to the module cable connector contact when the trim space receives the portion of the module cable connector subassembly via the support structure opening.

15. The support module assembly of claim 12, wherein:

an electrical coupling location of the cable module connector contact is operative to be electrically coupled to the module cable connector contact when the trim space receives the portion of the module cable connector subassembly; and the electrical coupling location of the cable module connector contact is positioned within the trim space.

16. The support module assembly of claim 12, wherein:

an electrical coupling location of the cable module connector contact is operative to be electrically coupled to the module cable connector contact when the trim space receives the portion of the module cable connector subassembly; and the electrical coupling location of the cable module connector contact is positioned within the cable module connector housing.

17. The support module assembly of claim 12, wherein:

a first electrical coupling location of the cable module connector contact is operative to be electrically coupled to the module cable connector contact when the trim space receives the portion of the module cable connector subassembly;

the first electrical coupling location of the cable module connector contact is positioned within at least one of the trim space or the cable module connector housing;

the support module assembly further comprises a circuit board;

a second electrical coupling location of the cable module connector contact is electrically coupled to the circuit board; and the second electrical coupling location of the cable module connector contact is positioned outside of the cable module connector housing.

18. The support module assembly of claim 12, wherein:

a first electrical coupling location of the cable module connector contact is operative to be electrically coupled to the module cable connector contact when the trim space receives the portion of the module cable connector subassembly;

the first electrical coupling location of the cable module connector contact is positioned within at least one of the trim space or the cable module connector housing;

the support module assembly further comprises a circuit board;

a second electrical coupling location of the cable module connector contact is electrically coupled to the circuit board; and the second electrical coupling location of the cable module connector contact is positioned outside of the trim space.

19. The support module assembly of claim 12, wherein the cable module connector subassembly provides a superset of a universal serial bus ("USB") Type-C connector.

20. A module cable connector subassembly for electrically coupling with a cable module connector subassembly, wherein the cable module connector subassembly comprises a cable module connector contact, the module cable connector subassembly comprising:

a boot structure comprising an interior boot surface and an exterior boot surface extending from a first boot open end to a second boot open end, wherein the interior boot surface defines a boot space;

a module cable connector contact comprising:

a first module cable connector contact portion that is positioned within the boot space; and a second module cable connector contact portion that is positioned outside of the boot space; and a gasket that is positioned at least partially about the module cable connector contact and across the second boot open end, wherein:

the gasket and the boot structure together provide at least a portion of an electromagnetic interference cage for protecting the first module cable connector contact portion from electromagnetic interference; and the gasket is operative to interact with a portion of the cable module connector subassembly to provide at least a portion of an electromagnetic interference shield for shielding an electrical signal communication coupling between the module cable connector subassembly and the cable module connector subassembly when the second module cable connector contact portion is electrically coupled to the cable module connector contact.

* * * * *